US009731247B2

(12) United States Patent
Lin et al.

(10) Patent No.: US 9,731,247 B2
(45) Date of Patent: *Aug. 15, 2017

(54) ION EXCHANGE MEMBRANES

(71) Applicant: EVOQUA WATER TECHNOLOGIES PTE. LTD., Singapore (SG)

(72) Inventors: Juchui Ray Lin, Bedford, MA (US); George Y. Gu, Andover, MA (US)

(73) Assignee: Evoqua Water Technologies LLC

( * ) Notice: Subject to any disclaimer, the term of this patent is extended or adjusted under 35 U.S.C. 154(b) by 0 days.

This patent is subject to a terminal disclaimer.

(21) Appl. No.: 14/603,115

(22) Filed: Jan. 22, 2015

(65) Prior Publication Data

US 2015/0217234 A1  Aug. 6, 2015

Related U.S. Application Data

(60) Continuation of application No. 14/189,097, filed on Feb. 25, 2014, now Pat. No. 9,023,902, which is a division of application No. 12/869,013, filed on Aug. 26, 2010, now Pat. No. 8,703,831.

(60) Provisional application No. 61/237,084, filed on Aug. 26, 2009, provisional application No. 61/237,076, filed on Aug. 26, 2009.

(51) Int. Cl.
| | |
|---|---|
| *B01D 61/44* | (2006.01) |
| *B01D 67/00* | (2006.01) |
| *B01D 69/02* | (2006.01) |
| *B01D 69/10* | (2006.01) |
| *C08J 5/22* | (2006.01) |
| *B01D 71/82* | (2006.01) |

(52) U.S. Cl.
CPC ......... *B01D 61/44* (2013.01); *B01D 67/0006* (2013.01); *B01D 69/02* (2013.01); *B01D 69/10* (2013.01); *B01D 71/82* (2013.01); *C08J 5/2225* (2013.01); *C08J 5/2243* (2013.01); *C08J 5/2275* (2013.01); *B01D 2323/30* (2013.01); *B01D 2325/20* (2013.01); *B01D 2325/26* (2013.01); *B01D 2325/42* (2013.01); *C08J 2323/06* (2013.01); *C08J 2327/16* (2013.01); *Y02P 20/57* (2015.11)

(58) Field of Classification Search
CPC .... B01D 61/44; B01D 67/0006; B01D 69/02; B01D 69/10; C08J 5/2225; C08J 5/2243; C08F 226/06; C08F 212/14
USPC .................... 521/27; 204/296, 295
See application file for complete search history.

(56) References Cited

U.S. PATENT DOCUMENTS

| | | | |
|---|---|---|---|
| 2,780,604 A | 2/1957 | Clarke et al. | |
| 3,009,895 A | 11/1961 | Slocombe | |
| 3,549,016 A | 12/1970 | Rigopulos | |
| 3,737,045 A | 6/1973 | Hashimoto et al. | |
| 3,926,864 A | 12/1975 | Hodgdon, Jr. | |
| 4,231,855 A | 11/1980 | Hodgdon et al. | |
| 4,297,431 A | 10/1981 | Sullivan | |
| 4,585,833 A | 4/1986 | Domeier | |
| 4,704,324 A | 11/1987 | Davis et al. | |
| 4,778,601 A | 10/1988 | Lopatin et al. | |
| 4,828,772 A | 5/1989 | Lopatin et al. | |
| 4,874,567 A | 10/1989 | Lopatin et al. | |
| 4,933,405 A | 6/1990 | Evani | |
| 5,032,274 A | 7/1991 | Yen et al. | |
| 5,039,420 A * | 8/1991 | Klein .................. | B01D 71/76 210/500.21 |
| 5,118,717 A | 6/1992 | Hodgdon et al. | |
| 5,120,632 A | 6/1992 | Bertrand et al. | |
| 5,145,618 A | 9/1992 | MacDonald et al. | |
| 5,194,189 A | 3/1993 | Papastavros et al. | |
| 5,264,125 A | 11/1993 | MacDonald et al. | |
| 5,380,413 A | 1/1995 | Posar et al. | |
| 5,401,408 A | 3/1995 | Umemura et al. | |
| 5,447,636 A | 9/1995 | Banerjee | |
| 5,510,394 A * | 4/1996 | Hodgdon ............... | C08J 5/2243 210/500.27 |

(Continued)

FOREIGN PATENT DOCUMENTS

| | | |
|---|---|---|
| CN | 1114237 A | 1/1996 |
| CN | 1986613 A | 6/2007 |

(Continued)

OTHER PUBLICATIONS

J.C. Salamone et al: "Polymerization of Vinylpyridinium Salts. XIII. Preparation of CVinyl-N-Methylpyridinium pStyrenesulfonate Charge Transfer Ion-Pair Comonomer", Dec. 31, 1985, XP055104794, Retrieved from the Internet: URL:http://onlinelibrary.wiley.com/store/10.1002/pol.1985.130231210/asset/130231210_ftp.pdf?v-1&t-hs6a53wy&s-e4772bb8729b1774cd920c40734d5b18cad056d1 [retrieved on Feb. 27, 2014] *p. 656, paragraph 7* *p. 658, paragraph 3*.

(Continued)

*Primary Examiner* — Michael M Bernshteyn

(57) ABSTRACT

Highly energy efficient electrodialysis membranes having low operating costs and a novel process for their manufacture are described herein. The membranes are useful in the desalination of water and purification of waste water. They are effective in desalination of seawater due to their low electrical resistance and high permselectivity. These membranes are made by a novel process which results in membranes significantly thinner than prior art commercial electrodialysis membranes. The membranes are produced by polymerizing one or more monofunctional ionogenic monomers with at least one multifunctional monomer in the pores of a porous substrate.

26 Claims, 2 Drawing Sheets

(56) References Cited

U.S. PATENT DOCUMENTS

| | | |
|---|---|---|
| 5,714,521 A | 2/1998 | Kedem et al. |
| 5,814,197 A | 9/1998 | Batchelder et al. |
| 5,849,167 A | 12/1998 | Posar |
| 5,868,976 A | 2/1999 | Puglia et al. |
| 5,961,796 A | 10/1999 | Hitchens et al. |
| 6,013,724 A | 1/2000 | Mizutani et al. |
| 6,117,297 A | 9/2000 | Goldstein |
| 6,217,733 B1 | 4/2001 | Hurwitz et al. |
| 6,221,248 B1 | 4/2001 | Lin et al. |
| 6,258,276 B1 | 7/2001 | Mika et al. |
| 6,277,512 B1 | 8/2001 | Hamrock et al. |
| 6,344,584 B2 | 2/2002 | Lin et al. |
| 6,410,672 B1 | 6/2002 | MacDonald et al. |
| 6,423,205 B1 | 7/2002 | Akahori et al. |
| 6,596,137 B2 | 7/2003 | Nago et al. |
| 6,723,758 B2 | 4/2004 | Stone et al. |
| 6,814,865 B1 | 11/2004 | Aminabhavi et al. |
| 6,828,386 B2 | 12/2004 | MacKinnon |
| 6,830,671 B2 | 12/2004 | Aritomi et al. |
| 6,849,688 B2 | 2/2005 | Hellums |
| 6,851,561 B2 | 2/2005 | Wu et al. |
| 6,924,318 B2 | 8/2005 | Mischi et al. |
| 7,081,484 B2 | 7/2006 | Sugaya et al. |
| 7,087,654 B2 | 8/2006 | MacDonald et al. |
| 7,201,832 B2 | 4/2007 | Yamanaka et al. |
| 7,247,370 B2 | 7/2007 | Childs et al. |
| 7,316,919 B2 | 1/2008 | Childs et al. |
| 7,318,972 B2 | 1/2008 | Highgate |
| 7,368,200 B2 | 5/2008 | Zhu et al. |
| 7,396,465 B2 | 7/2008 | Wu et al. |
| 7,425,583 B2 | 9/2008 | Inoue et al. |
| 7,449,111 B2 | 11/2008 | Hedhli et al. |
| 7,514,481 B2 | 4/2009 | Yandrasits et al. |
| 7,544,278 B2 | 6/2009 | Aminabhavi et al. |
| 7,632,406 B2 | 12/2009 | Wilson et al. |
| 7,649,025 B2 | 1/2010 | Kitamura et al. |
| 7,674,505 B2 | 3/2010 | Kerres et al. |
| 7,740,967 B2 | 6/2010 | Oren et al. |
| 7,790,837 B2 | 9/2010 | McGrath et al. |
| 7,829,218 B2 | 11/2010 | Endo et al. |
| 7,833,644 B2 | 11/2010 | Chokai et al. |
| 7,868,124 B2 | 1/2011 | Balland-Longeau et al. |
| 7,888,397 B1 | 2/2011 | Hibbs et al. |
| 7,893,303 B2 | 2/2011 | Yamakawa et al. |
| 7,901,831 B2 | 3/2011 | Brunea |
| 7,910,236 B2 | 3/2011 | Hommura et al. |
| 7,923,166 B2 | 4/2011 | Fukuta et al. |
| 7,931,995 B2 | 4/2011 | Bahar et al. |
| 7,938,941 B2 | 5/2011 | Kashiwada et al. |
| 7,947,196 B2 | 5/2011 | Lee et al. |
| 7,959,780 B2 | 6/2011 | Hawkins et al. |
| 7,968,663 B2 | 6/2011 | MacDonald et al. |
| 7,977,392 B2 | 7/2011 | MacKinnon et al. |
| 8,075,951 B2 | 12/2011 | Hammond-Cunningham et al. |
| 8,114,550 B2 | 2/2012 | Suzuki et al. |
| 8,349,155 B2 | 1/2013 | Umemura et al. |
| 8,367,267 B2 | 2/2013 | Frey et al. |
| 8,703,831 B2 * | 4/2014 | Lin .................. B01D 61/44 204/295 |
| 8,969,424 B2 * | 3/2015 | Lin .................. C08F 226/06 204/295 |
| 9,023,902 B2 * | 5/2015 | Lin .................. B01D 61/44 204/295 |
| 2002/0019448 A1 | 2/2002 | Sugaya et al. |
| 2002/0045085 A1 | 4/2002 | Formato et al. |
| 2003/0024816 A1 | 2/2003 | Aritomi et al. |
| 2003/0105173 A1 | 6/2003 | Sugaya et al. |
| 2004/0175625 A1 | 9/2004 | Hedhli et al. |
| 2004/0241518 A1 | 12/2004 | Yang |
| 2005/0011826 A1 | 1/2005 | Childs et al. |
| 2005/0250919 A1 | 11/2005 | Caneba et al. |
| 2006/0000778 A1 | 1/2006 | Childs et al. |
| 2006/0045985 A1 * | 3/2006 | Kozak ................ H01M 4/8657 427/458 |
| 2007/0020499 A1 | 1/2007 | Suzuki et al. |
| 2007/0031716 A1 | 2/2007 | Rajendran |
| 2007/0261962 A1 | 11/2007 | Gajek |
| 2008/0023334 A1 * | 1/2008 | Nakagawa ............. B01D 61/44 204/632 |
| 2008/0223785 A1 | 9/2008 | Miller et al. |
| 2009/0137757 A1 * | 5/2009 | Imuta .................... C09J 153/00 526/127 |
| 2009/0155370 A1 | 6/2009 | Cope et al. |
| 2010/0056650 A1 | 3/2010 | Highgate |
| 2010/0062313 A1 | 3/2010 | Browning et al. |
| 2010/0065490 A1 | 3/2010 | Balster et al. |
| 2010/0239946 A1 | 9/2010 | Miyachi et al. |
| 2011/0020730 A1 | 1/2011 | Mizuno et al. |
| 2011/0068002 A1 | 3/2011 | Lin et al. |
| 2011/0097645 A1 | 4/2011 | Van Baak et al. |
| 2011/0132762 A1 | 6/2011 | O'Brien et al. |
| 2011/0147308 A1 | 6/2011 | Johnston-Hall et al. |
| 2011/0189585 A1 | 8/2011 | Brunea |
| 2011/0200907 A1 | 8/2011 | Moon et al. |
| 2011/0203990 A1 | 8/2011 | Murphy et al. |
| 2011/0224314 A1 | 9/2011 | MacDonald et al. |
| 2011/0281197 A1 | 11/2011 | Daikoku et al. |
| 2011/0290727 A1 | 12/2011 | Van Engelen |
| 2012/0006685 A1 | 1/2012 | Van Engelen |
| 2012/0014858 A1 | 1/2012 | Rowell |
| 2012/0024697 A1 | 2/2012 | Antheunis et al. |
| 2012/0031834 A1 | 2/2012 | Higa et al. |
| 2012/0035280 A1 | 2/2012 | Jikihara et al. |
| 2012/0248028 A1 | 10/2012 | Antheunis et al. |
| 2012/0248029 A1 | 10/2012 | Antheunis et al. |
| 2012/0248030 A1 | 10/2012 | Antheunis et al. |
| 2012/0248032 A1 | 10/2012 | Van Berchum et al. |
| 2012/0329891 A1 | 12/2012 | Lee et al. |

FOREIGN PATENT DOCUMENTS

| | | |
|---|---|---|
| JP | S63-503074 A | 11/1988 |
| JP | 2000-503898 A | 4/2000 |
| JP | 2001-157823 A | 6/2001 |
| JP | 2005-334263 A | 12/2005 |
| JP | 2006-519273 A | 8/2006 |
| JP | 2008-255351 A | 10/2008 |
| JP | 2008288065 A | 11/2008 |
| JP | 2009144041 A * | 7/2009 |
| JP | 2009-173786 A | 8/2009 |
| JP | 2009-173828 A | 8/2009 |
| JP | 2009-215499 A | 9/2009 |
| JP | 2009-215500 A | 9/2009 |
| WO | 0193361 A2 | 12/2001 |
| WO | 03008078 A2 | 1/2003 |
| WO | 2004073843 A1 | 9/2004 |
| WO | 2005102503 A1 | 11/2005 |
| WO | 2010007399 A1 | 1/2010 |
| WO | 2010013861 A1 | 2/2010 |
| WO | 2010106356 A1 | 9/2010 |
| WO | 2010106357 A1 | 9/2010 |
| WO | 2011025867 A1 | 3/2011 |
| WO | 2012051608 A1 | 4/2012 |
| WO | 2012051610 A1 | 4/2012 |
| WO | 2012081026 A2 | 6/2012 |
| WO | 2013014420 A1 | 1/2013 |
| WO | 2013052227 A1 | 4/2013 |

OTHER PUBLICATIONS

Pandey, Ashok K. et al., "Formation of Pore-Filled Ion-Exchange Membranes within Situ Crosslinking: Poly (Vinylbenzyl Ammonium Salt)-Filled Membranes", Journal of Polymer Science Part A: Polymer Chemistry, vol. 39, No. 6, Mar. 15, 2001.

* cited by examiner

Construction of the membrane test cell and the reference electrode

ION EXCHANGE MEMBRANES

CROSS-REFERENCE TO RELATED APPLICATIONS

This application is a continuation under 35 U.S.C. §120 of U.S. patent application Ser. No. 14/189,097 filed Feb. 25, 2014 entitled ION EXCHANGE MEMBRANES, which is a divisional under 35 U.S.C. §120 of U.S. patent application Ser. No. 12/869,013 filed Aug. 26, 2010 entitled ION EXCHANGE MEMBRANES, which claims priority under 35 U.S.C. §119(e) to U.S. Provisional Application Ser. No. 61/237,076 filed on Aug. 26, 2009 entitled CATION EXCHANGE MEMBRANE and to U.S. Provisional Application Ser. No. 61/237,084 filed on Aug. 26, 2009 entitled ANION EXCHANGE MEMBRANE both of which are incorporated by reference in its entirety for all purposes.

FIELD OF THE INVENTION

Embodiments of the present invention provide for ion exchange membranes and processes for their manufacture. The electrodialysis membranes described herein combine low resistance and high permselectivity which make them highly effective in water desalination applications, particularly in seawater desalination. The ion exchange membranes described herein are made by polymerizing one or more monofunctional ionogenic monomers, optionally a neutral monomer with at least one multifunctional monomer in the pores of a porous substrate.

BACKGROUND OF THE INVENTION

Ion exchange membranes transport cations or anions under an electrical or chemical potential. Ion exchange membranes have either negatively or positively charged groups attached to the polymeric material making up the bulk of the membrane. The counterion of each is the transferable ion. A cation exchange membrane will have fixed negative charges and mobile positively charged cations. Similarly, anion exchange membranes will have fixed positively charged groups and mobile negatively charged anions. Ion exchange membrane properties are controlled by the amount, type and distribution of the fixed ionic groups. These membranes may be described as strong acid and strong base, or weak acid and weak base membranes. Strong acid cation exchange membranes usually have sulfonic acid groups as the charged group, whereas for weak acid membranes, carboxylic acid typically makes up the fixed charged group. Quaternary and tertiary amines respectively produce the fixed positive charged groups in strong and weak base anion exchange membranes.

Among the most important applications of ion exchange membranes are desalination of water by electrodialysis (ED), as a power generating sources in reverse electrodialysis and as separators in fuels cells. Other applications include recovery of metal ions in the electroplating and metal finishing industries and various applications in the food and beverage industry.

Electrodialysis desalinates water by transferring ions and some charged organics through paired anion- and cation selective membranes under the motive force of a direct current voltage. An ED apparatus consists of electrically conductive and substantially water impermeable anion selective and cation selective membranes arranged as opposing walls of a cell. Adjacent cells form a cell pair. Membrane stacks consist of many, sometime hundreds of cell pairs, and an ED system may consist of many stacks. Each membrane stack has a DC (direct current) anode at one end of the stack and a DC cathode at the other end. Under a DC voltage, ions move to the electrode of opposite charge.

A cell pair consists of two types of cells, a diluting cell and a concentrating cell. As an illustrative example, consider a cell pair with a common cation transfer membrane wall and two anion transfer membrane walls forming the two cells. That is, a first anion transfer membrane and the cation transfer membrane form the dilute cell and the cation transfer membrane and a second anion membrane form the concentrating cell. In the diluting cell, cations will pass through the cation transfer membrane facing the anode, but be stopped by the paired anion transfer membrane of the concentrating cell in that direction facing the cathode. Similarly, anions pass through the anion transfer membrane of the diluting cell facing the cathode, but will be stopped by the cation transfer of membrane of the adjacent pair facing the anode. In this manner, salt in a diluting cell will be removed and in the adjacent concentrating cells cations will be entering from one direction and anions from the opposite direction. Flow in the stack is arranged so that the dilute and concentrated flows are kept separate and a desalinated water stream is produced from the dilute flow.

In the ED process, material commonly builds up at the membrane surface in the direction of the electric field, which can, and usually does reduce process efficiency. To combat this effect, Electrodialysis reversal (EDR) was developed and is the primary method of use presently. In EDR, the electrodes are reversed in polarity on a regular basis, for example, every fifteen to sixty minutes. The dilute and concentrate flows are simultaneously switched as well, the concentrate becoming the dilute flow and vice versa. In this way fouling deposits are removed and flushed out.

Once the concentration in the dilution cells falls to lower than about 2000 milligrams/liter (mg/l), electrical resistance is at a level that power demand becomes increasing expensive. To overcome this, and to be able to produce high quality water, electrodeionization (EDI), sometimes called continuous electrodeionization (CEDI) was developed. In this method the cells are filled with ion exchange media, usually ion exchange resin beads. The ion exchange media is orders of magnitude more conductive than the solution. The ions are transported by the beads to the membrane surface for transfer to the concentrate cells. EDI is capable of producing purer water then ED at less power when the feed concentration is reduced sufficiently.

ED processes for water desalination have advantages over RO. They require less pretreatment which will reduce operating costs. They will have higher product water recovery and a higher brine concentration, i.e., there is less brine to dispose.

Univalent selective or monovalent selective membranes primarily transfer monovalent ions. Monovalent selective cation transfer membranes primarily transfer sodium, potassium, etc. Likewise, monovalent selective anion membranes transfer ions such as chloride, bromide, nitrate etc.

Reverse osmosis (RO) dominates the production of fresh water from seawater by membrane processes. While electrodialysis (ED) is used for brackish water and waste water desalination, it is generally considered too expensive for seawater use. In order to be competitive with RO, ED and EDR will require membrane resistance of less than 1 ohm-$cm^2$, preferably less than 0.8 ohm-$cm^2$, and most preferably less than 0.5 ohm-$cm^2$. Ion permselectivity of greater than 90%, more preferably greater than 95%, and most preferably greater than 98% is desired. The membrane has to have long service life, and be physically strong and chemically durable and be low cost.

Reverse electrodialysis (RED) converts the free energy generated by mixing the two aqueous solutions of different salinities into electrical power. The greater the difference in salinity, the greater the potential for power generation. For example, researchers have studied RED using Dead Sea water and fresh or seawater. Researchers in Holland have mixed river water entering the sea and seawater. RED membranes preferably will have a low electrical resistance and a high co-ion selectivity and long service life time, acceptable strength and dimensional stability and, importantly, low-cost.

The polymer electrolyte membrane (PEM) is a type of ion exchange membrane that serves both as the electrolyte and as a separator to prevent direct physical mixing of the hydrogen from the anode and oxygen supplied to the cathode. A PEM contains negatively charged groups, usually sulfonic acid groups, attached or as part of the polymer making up the PEM. Protons migrate through the membrane by jumping from one fixed negative charge to another to permeate the membrane.

PEM's requirements include chemical, thermal and electrochemical stability, and adequate mechanical stability and strength when swollen and under mechanical stress. Other requirements include low resistance, low or preferably no methanol transport in direct methanol fuel cells (DMFC), and low cost.

Development of ion exchange membranes requires an optimization of properties in order to overcome competing effects. Ion exchange membranes for water desalination traditionally have had to meet four main characteristics to be considered successful. These are;

Low electrical resistance to reduce potential drop during operation and to increase energy efficiency High permselectivity—that is, high permeability to counter-ions but approximately impermeable to co-ions High chemical stability—ability to withstand pH from 0 to 14 and oxidizing chemicals Mechanical strength—The membrane must be able to withstand the stresses of being handled while being manufactured into a module or other processing device. The membrane must also have good dimensional stability in operation and not swell or shrink excessively when the fluid contacting it changes concentration or temperature.

Membrane developers have recognized that for a given chemistry used to make an ion exchange membrane, a thinner membrane would give a lower resistance and also allow more membrane area per unit volume of device. However, thinner membranes are more susceptible to dimensional change from environmental effects, such as changes in ionic concentration of the fluids contacting them or operating temperature changes. Moreover, to develop and produce defect-free membranes is more difficult for the case of thinner membranes because there is less margin of error during membrane production as there is for thicker membranes where the membrane thickness covers over defects that may occur in membrane formation.

U.S. Pat. No. 7,226,646 describes an ion conducting membrane comprising an ion conducting region and a non-ion conducting region. The ion conducting region is formed by a plurality of passageways extending through the membrane filled with ion conducting material. The passageways may be formed in the substrate sheet by a number of methods, such as drilling, chemical etching, or punching, to provide straight-through passageways. Preferred arrangements of passageways are square, rectangular, triangular or hexangular arrays. Ionogenic polymers are deposited in the passageways to make up the ion conducting regions. In some embodiments a skin is bonded to the surface of the substrate, or coated onto one or both surfaces.

U.S. Pat. No. 7,649,025 describes a composite ion exchange membrane comprising a support membrane and ion exchange resin composition within the pores of the substrate. The ion exchange resin is a specific class of aromatic polyethers. In related U.S. Pat. No. 7,537,852, the porous membrane is a polybenzazole membrane.

U.S. Pat. No. 7,550,216 describes a composite solid polymer electrolyte membrane comprising a porous polymer substrate interpenetrated with a water soluble ion-conducting material. The porous polymer substrate comprises a homopolymer or copolymer of a liquid crystalline polymer such as such as a polybenzazole (PBZ) or polyaramid polymer. Preferred polybenzazole polymers include polybenzoxazole (PBO), polybenzothiazole (PBT) and polybenzimidazole (PBI) polymers. Preferred polyaramid polymers include polypara-phenylene terephthalamide (PPTA) polymers. In other preferred embodiments, the polymer substrate comprises a thermoplastic or thermoset aromatic polymer. The ion-conducting material comprises a water soluble homopolymer or water soluble copolymer of at least one of a sulfonated ion-conducting aromatic polymer.

W. L. Gore & Associates, Inc. (Newark, Del.) describes, in U.S. Pat. No. 6,254,978, a integral composite membrane having a porous polymeric membrane impregnated with a perfluoro ion exchange material to make the micropores of the membrane occlusive and a surfactant having a molecular weight greater than 100 wherein the thickness of the composite membrane is less than 0.025 mm. U.S. Pat. No. 5,547,551 describes a composite membrane comprising expanded polytetrafluoroethylene membrane support impregnated with ion exchange material, having a total thickness of less than 0.025 mm. U.S. Pat. Nos. 5,599,614 and 5,635,041 also describe composite membranes comprising microporous expanded PTFE substrates impregnated with Nafion® (E.I. DuPont Wilmington Del.). Gore-Select® membranes (W.L. Gore & Associates, Inc., Elkton, Md.) are composite membranes comprising a microporous expanded PTFE membrane having an ion exchange material impregnated therein.

U.S. Pat. No. 6,110,333 describes a composite membrane comprising an ion exchange polymer and a support of expanded polytetrafluoroethylene polymer having a porous microstructure of polymeric fibrils, said expanded polytetrafluoroethylene polymer being at least about 85% crystalline.

U.S. Pat. No. 6,689,501 describes a composite membrane for use in a fuel cell membrane electrode assembly comprising a porous polymeric substrate and a cation exchange material impregnant partially filling the substrate such that the substrate comprises a first region having pores substantially filled with the impregnant, and a second substantially porous region. The cation exchange material covers one surface of the substrate in a dense surface layer, contiguous with the first region of the substrate. The substrate has greater than 10% residual porosity, and the composite membrane is substantially gas impermeable and has at least one substantially porous major surface. U.S. Pat. No. 5,985,942 describes composite membranes comprising a porous substrate and ion exchange materials comprising substituted trifluorostyrene polymers and copolymers.

McMaster University has two US patents related to composite membranes having polyelectrolytes or hydrogels bonded or crosslinked around porous support structural elements. U.S. Pat. No. 6,258,276 discloses charged membranes comprising a porous substrate and a cross-linked polyelectrolyte or hydrogel located in the pores of the substrate. The patent discloses polymerization in the substrate pores of a monomer or a mixture of monomers with a cross-linking agent, the monomer or at least one of the monomer mixture being selected from those monomers which contain a functional group that provides an ion-exchange site and those which contain a group which is susceptible to a chemical reaction by which such functional groups are subsequently introduced to the in situ-formed polymer. Alternatively, an uncrosslinked polyelectrolyte or hydrogel may be formed in the pores of the substrate as described and subsequently crosslinked.

U.S. Pat. No. 7,247,370 provides for an asymmetric membranes composed of a microporous substrate whose pores contain a crosslinked gel, preferably a hydrogel or a polyelectrolyte gel, located in pores of the substrate, where the density of the crosslinked gel is greater at or adjacent to one major surface of the membrane than the density at the other major surface so that there is a gradient of gel distribution from one major surface of the membrane towards the other major surface of the membrane.

U.S. Pat. No. 5,510,394 discloses a process where a solid polymeric sheet which has been cast or extruded with a fixed percentage of a high boiling point ester plasticizer is then immersed or otherwise contacted with one or more monomers along with a small fraction of a crosslinking bifunctional monomer such as divinyl benzene. The monomers exchange with the high boiling point plasticizers and are polymerized within the interstices of the base films. The monomers may be ion containing monomers, or monomers which can be converted after polymerization into an ion exchange membranes by for example, sulfonation of phenyl groups or amination by tertiary amines of chloromethyl groups attached to aromatic polymers.

WO2010/013861 describes an anion exchange composite membrane that is produced by impregnating a porous film with a styrene-based monomer, a vinylbenzene-based monomer, a crosslinking agent and an initiator, and after polymerization, functionalizing the resulting crosslinked polymer by adding ammonium ions.

Membranes having charged polymers are known. Charged membranes, usually negatively charged, are used for nanofiltration. Such membranes are made to have a high water permeability. Such membranes would not be suitable for ED as they would have high osmotic flow due to their high water permeability. This effect would give poor co-ion rejection. Membranes for fuel cells are designed to transport hydrogen ions and are not suitable for transferring larger ions.

SUMMARY OF THE INVENTION

Figure 1:
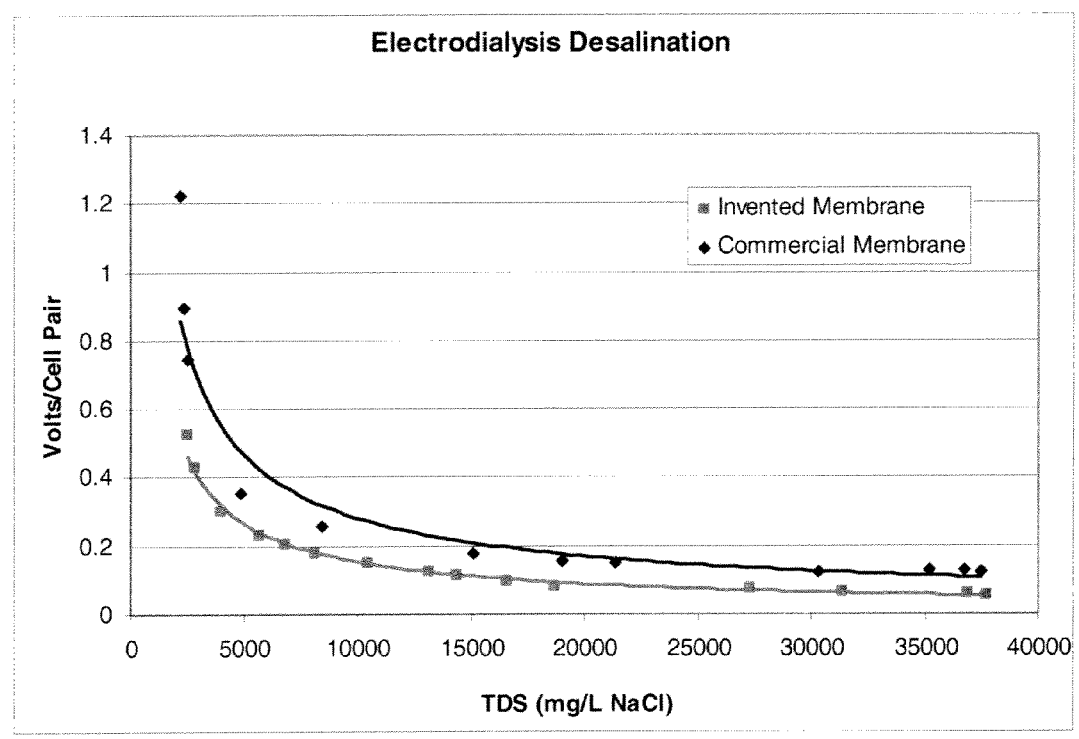
FIG. 1 shows the relation between volts/cell pair and total dissolved solids in the feed solution for the test described in Example 7.

Described herein are novel ion exchange membranes for electrodialysis having a beneficial combination of high energy efficiency, resulting in low operating costs, and high permselectivity. The membranes are useful for water desalination, and are suitable for seawater desalination.

The membranes are produced by a process comprising choosing a suitable porous substrate, saturating the porous regions of the substrate with a solution comprising a monofunctional ionogenic monomer, a multifunctional monomer, and a polymerization initiator, removing excess solution from the surfaces of the substrate while leaving the porous volume saturated with solution, initiating polymerization by the application of heat, ultraviolet light, or ionizing radiation, optionally in the absence of substantially all oxygen, to form a crosslinked ion transferring polymer substantially completely filling the pores of the substrate.

The microporous support preferably comprises microporous membranes of polypropylene, high molecular weight polyethylene, ultrahigh molecular weight polyethylene or polyvinylidene fluoride. The supports are preferably not greater than about 55 microns in thickness, more preferably not thicker than 25 microns.

Cation exchange membrane embodiments described have resistivities of no greater than about approximately 1.0 Ohm-cm$^2$, preferably no greater than about approximately 0.5 Ohm-cm$^2$. Preferred embodiments of the cation exchange membranes have permselectivities of greater than about approximately 95%, more preferably greater than about approximately 99%. Preferred ionogenic monomers for the production of cation exchange membranes are 2-sulfoethylmethacrylate (2-SEM or 2-acrylamide-2-methyl propane sulfonic acid (AMPS). A preferred crosslinker is ethyleneglycoldimethacrylate.

Anion exchange membrane embodiments described have resistivities of no greater than about approximately 1.0 Ohm-cm$^2$, preferably no greater than about approximately 0.5 Ohm-cm$^2$. Preferred embodiments of the anion exchange membranes have permselectivities of greater than about approximately 90%, more preferably greater than about approximately 95%. Preferred ionogenic monomers for the production of anion exchange membranes are Trimethylammoniummethylmethacrylic chloride crosslinked with ethyleneglycoldimethacrylate, or glycidyl methacrylate/N,N-dimethylethylenediamine reaction product crosslinked with ethyleneglycoldimethacrylate, and the crosslinked ion transferring polymer formed by polymerization of N,N,N',N',N''-pentamethyldiethylenetriamine di(vinylbenzyl chloride (a quaternary salt of N,N,N',N',N''-pentamethyldiethylenetriamine and vinylbenzyl chloride) or 1,4-diazabicyclo[2,2,2]octane di(vinylbenzyl chloride) (a quaternary salt of 1,4-diazabicyclo[2,2,2]octane (DABCO) and vinylbenzyl chloride).

An embodiment of these membranes is produced by the polymerization of an one or more ionogenic monomers, a neutral monomer and a suitable crosslinker monomer. Preferred neutral monomer is hydroxyethyl acrylate and hydroxymethylmetacrylate.

DETAILED DESCRIPTION OF THE INVENTION

The membranes described herein were developed in answer to the need for low cost electrodialysis membranes and systems for water desalination, more particularly, for low cost, energy efficient electrodialysis membranes and systems for seawater desalination.

Through diligent and extensive experimentation, the inventors have found that superior cation exchange (CEM) or anion exchange membranes (AEM) are produced by the methods and procedures described herein. Faced with the problem of developing a ion exchange membranes suitable for economically desalinating seawater, the inventors realized that a mechanically strong membrane having low electrical resistance and high permselectivity was required. Furthermore, it was concluded that to achieve low resistance would require a thin membrane.

Good mechanical strength allows the membrane to withstand the stresses of a continuous membrane manufacturing process, and be fabricated and sealed into the final membrane-holding device or module without overt damage or hidden damage which could appear after some time of operation. In addition, mechanical strength encompasses high dimensional stability. The ED membrane must exhibit minimal variation in dimensions while working as a desalination apparatus, during cleaning, sanitizing or defouling regimes, or during shipping or while in storage. High dimensional stability to changes in ionic content or of the temperature, for example, of the fluid contacting the CEM is important because during operation variations in the distance between membrane pairs could lead to current inefficiencies. Changes in dimensions during electrodialysis could also cause stresses in the constrained ED membrane leading to membrane defects and poor performance.

Low resistance reduces the electrical energy required to desalinate and lowers operating cost. Specific membrane resistance is measured in Ohm-centimeters ($\Omega$ cm). A more convenient engineering measure is Ohm-cm$^2$ ($\Omega$ cm$^2$). Resistance may be measured by using a cell having two electrodes of known area, platinum or black graphite are typically used, with the membrane sample of known area between them in a electrolyte solution. The electrodes do not touch the membrane. Membrane resistance is estimated by subtracting the electrolyte resistance without the membrane from the test result with the membrane in place. The resistance may also be measured by determining a voltage vs. current curve in a cell having two well stirred chambers separated by the membrane. A calomel electrode measures the potential drop across the membrane. The slope of the potential drop vs. current curves, which may be obtained by varying voltage and measuring current. Electrochemical impedance may also be used. In this method, alternating current is applied across the membrane. Measurement at a single frequency gives data relating to electrochemical properties of the membrane. By using frequency and amplitude variations, detailed structural information may be obtained. Herein, resistance will be defined by the methods described in the Experimental section.

Permselectivity refers to the relative transport of counterions to co-ions during electrodialysis. For an ideal cation exchange membrane only positively charged ions would pass the membrane, giving a permselectivity of 1.0. Permselectivity is found by measuring the potential across the membrane while it separates monovalent salt solutions of different concentrations. The method and calculations used herein are described in the Experimental section.

To meet these initial goals the inventors developed a type of composite ion exchange membrane in which a crosslinked polymer having charged ionic groups attached is contained in the pores of a microporous membrane substrate. The porous membrane substrate is preferably less than about approximately 155 microns thick, more preferably less than about approximately 55 microns thick.

Substrate membranes having porosity greater than about 45% are preferred, with those having porosities greater than about 60% more preferred. In the most preferred embodiments, the substrate membranes have porosities greater than about 70%. Preferred substrate membranes have a rated pore size of from about approximately 0.05 microns to about approximately 10 microns, with a more preferred range of from about approximately 0.1 microns to about approximately 1.0 microns. Most preferred porous substrates have a rated pore size of from about approximately 0.1 microns to about approximately 0.2 microns.

Microporous membrane supports may be manufactured from polyolefins, polyvinylidene fluoride, or other polymers. A class of preferred substrates comprises thin polyolefin membranes manufactured primarily for use as battery separators. A more preferred substrate class are thin battery separators manufactured from ultrahigh molecular weight polyethylene (UHMWPE).

To produce the desired ion exchange membranes, the inventors developed a method of placing the crosslinked charged polymer in the pores of the substrate by polymerizing the crosslinked polymer in these pores. The method involved saturating the porous substrate with a solution of charged monomer, multifunctional monomer. (e.g., a crosslinking agent) and polymerization initiator. Herein we use the term ionogenic monomer to mean a monomer species having at least one charged group covalently attached. The charged group can be positively charged or negatively charged. In an embodiment, the crosslinked polymer was produced by polymerizing a multifunctional charged monomer. The Polymerization was initiated by heat or by UV light. Monofunctional monomers are monomers which have a single site for carrying forward the polymerization reaction. Multifunctional monomers have more than one polymerization reaction site and so can form networked or crosslinked polymers.

The following laboratory method was used to investigate formulation and process effects by producing small coupons for resistivity and permselectivity testing. Porous membrane substrate 43 mm diameter coupons were die cut. Somewhat larger discs (50 mm or 100 mm diameter) of transparent polyester sheets were also die cut. A 105 mm aluminum weighing boat was typically used to hold a set of coupons. The coupons were sandwiched between two polyester film discs. First, substrate coupons were thoroughly wetted with a monomer solution to make up a test sample. This was done by adding the formulated solution to the aluminum boat, and immersing a polyester film disc with a substrate coupon layered on it into the solution so that the porous support is saturated. The saturated support was then removed form the monomer solution and placed on a piece of polyester film. Air bubbles were removed from the coupon by, for example, smoothing or squeezing the coupon with a convenient tool, such as a small glass rod, or by hand. A second polyester disc was then layered on top of the first coupon and smoothed to have complete surface contact between the coupon and the lower and upper polyester film layers. A second porous substrate was then layered on the upper polyester film and the saturation, smoothing and addition of a over layer of polyester film repeated to give a multilayer sandwich of two coupons and three protective polyester film layers. A typical experimental run would have a multilayered sandwich of 10 or more saturated substrate coupon layers. The rim of the aluminum boat can be crimped down to hold the disc/coupon assembly if required.

The boat and assembly were then placed in a sealable bag, typically a zip-lock polyethylene bag and a low positive pressure of inert gas, usually nitrogen, added before sealing the bag. The bag containing the boat and coupon assembly is placed into a oven at 80° C. for up to 30 minutes. The bag is then removed and cooled, and the now reacted cation exchange membrane coupons are placed in 0.5N NaCl solution at 40° C.-50° C. for at least 30 minutes, with NaCl soak of up to 18 hours being found satisfactory.

Monomers containing negatively charged groups useful for making cation exchange membranes of the present invention include as representative examples, without being limited by such examples; sulfonated acrylic monomers suitable to provide cation exchange capacity; e.g., 2-sulfoethylmethacrylate (2-SEM), 2-Propylacrylic acid, 2-acrylamide-2-methyl propane sulfonic acid (AMPS), sulfonated glycidylmethacrylate, 3-sulfopropyl methacrylate, sodium 1-allyloxy-2 hydroxypropyl sulfonate and the like; other example monomers are acrylic and methacrylic acid or their salts, sodium styrene sulfonate, styrene sulfonic acid, sulfonated vinylbenzyl chloride sodium 1-allyloxy-2 hydroxypropyl sulfonate, 4-Vinylbenzoic acid, Trichloroacrylic acid, vinyl phosphoric acid and vinyl sulfonic acid. Preferred monomers are 2-sulfoethylmethacrylate (2-SEM), styrene sulfonic acid and its salts, and 2-acrylamide-2-methyl propane sulfonic acid (AMPS).

Monomers containing positively charged groups useful for making anion exchange membranes of the present invention include as representative examples, without being limited by such examples; Methacrylamidopropyltrimethyl ammonium chloride, trimethylammoniummethylmethacrylate; quarternary salts of polyamines and vinylaromatic halides, for example, but limited to; 1,4-diazabicyclo[2,2,2] octane di(vinylbenzyl chloride) (a quaternary salt of 1,4-diazabicyclo[2,2,2]octane (DABCO) and piperazine divinyl chloride; or quarternary salts formed by reacting cyclic ethers, polyamines and alkyl halides; for example, but not limited to; Iodoethyldimethylethylenediamino2-hydroxylpropyl methacrylate (a quaternary ammonium salt formed by reacting glycidylmethacrylate (GMA) with N,N-dimethylethylenediamine and ethyl iodide, and vinylbenyltrimethylammonium chloride.

Preferred monomers for anion exchange membranes are Trimethylammoniumethylmethacrylic chloride, 3-acrylamidopropyl)trimethylammonium chloride, 1,4-diazabicyclo[2,2,2]octane di(vinylbenzyl chloride) (a quaternary salt of 1,4-diazabicyclo[2,2,2]octane (DABCO) and vinylbenzyl chloride, N,N,N',N',N"-pentamethyldiethylenetriamine di(vinylbenzyl chloride (a quaternary salt of N,N,N',N',N"-pentamethyldiethylenetriamine and vinylbenzyl chloride, Glycidyl methacrylate/trimethylamine or Glycidyl methacrylate/N,N-dimethylethylenediamine reaction product.

Multifunctional monomers suitable to provide crosslinking with monomers containing negatively or positively charged groups include as representative examples, without being limited by such examples ethyleneglycol dimethacrylate, 1,3-butanediol dimethacrylate, 1,3-butanediol diacrylate, 1,4-butanediol dimethacrylate, 1,4-butanediol diacrylate, 1,6-hexanediol diacrylate, pentaerythritol triacrylate, tetraethylene glycol dimethacrylate, divinyl benzene, trimethylolpropane triacrylate, isophorone diisocyanate, glycidylmethacrylate, trimethylolpropane trimethacrylate, ethoxylated (n) bisphenol A di(meth)acrylate (n=1.5, 2, 4, 6, 10, 30), ethoxylated (n) trimethylolpropanetri(meth)Acrylate (n=3, 6, 9, 10, 15, 20), propoxylated(n) trimethylolpropane triacrylate (n=3,6), vinylbenzyl chloride, glycidyl methacrylate and the like.

Multifunctional monomers containing one or more ionic groups may be used. Without being limited by the example, monomers such as 1,4-divinylbenzene-3 sulfonic acid or its salts may be used.

The degree of crosslinking may range from 2% to 60%.

Free radical initiators useful for the present invention include, but are not limited to; benzoyl peroxide (BPO), ammonium persulfate, 2,2'-azobisisobutyronitrile (AIBN), 2,2'-azobis(2-methylpropionamidine)dihydrochloride, 2,2'-Azobis[2-(2-imidazolin-2yl)propane]dihydrochloride, 2,2'-Azobis[2-(2-imidazolin-2-yl)propane] and dimethyl 2,2'-azobis(2-methylpropionate).

A person skilled in the art of membrane development and manufacturing will realize that this convenient laboratory method can be adapted to other laboratory scaled methods and may be scaled up to continuous manufacturing.

For example, the substrate pore filling or saturation may be done at a slightly elevated temperature (>40° C.) to reduce air solubility, or this step could be done after a mild vacuum treatment of the substrate sample submerged in the formulation solution. Substrate samples may be presoaked and then placed on the polyester or similar sheet and covered with a covering sheet and smoothed out to remove air bubbles. Several presoaked pieces may be layered and then placed on the polyester or similar sheet and covered with a covering sheet and smoothed out to remove air bubbles.

Rather than heating in an oven, the saturated substrate sandwich may be placed on a heated surface at a temperature sufficient and for a time necessary to initiate and complete polymerization. Alternate methods for initiation of the polymerization reaction may be used. Ultraviolet light or ionizing radiation, such as gamma radiation or electron beam radiation may be used to initiate the polymerization reaction.

A continuous pilot or manufacturing process may comprise a step to saturate the porous substrate, followed by a step to initiate and complete the polymerization, followed by a step to wash or leach out non-polymerized species from the now-formed membrane. The membrane may be optionally dried. Conditioning with a salt solution could be done in a continuous immersion process, such as through a tank of a salt solution, or by soaking a wound up roll of membrane, or after fabrication into a module.

If the monomer solution is formulated with a solvent which wets out the substrate, the process would start by feeding substrate from a roll into and through a tank of the monomer formulation and wiping off excess solution. The saturated substrate then could be sandwiched between two layers of plastic sheeting fed from rolls and nipped between two rolls to remove air and produce a smooth multilayered assembly. A preferred sheeting material is polyethylene terepthalate film. This assembly would then be processed through an oven, or over a heated roll, to initiate and complete polymerization. An alternative would be to run the saturated sheet through an oven blanketed with inert gas. This alternative would be suitable for use with solvents having a high boiling point.

UV light initiation with suitable initiators could be used. The three layer sandwich described would be run through a tunnel or other process equipment having an inlet and outlet for the substrate web with UV light sources on one or both sides of the web. With a high boiling formulation, this may be done in an inert gas atmosphere.

If the three layer sandwich is used, the covering sheets are removed after polymerization and the now-formed membrane is washed and optionally dried.

In the experiments shown in the Examples section, an organic solvent, N-methyl pyrrolidone was used as the reactant carrier. A preferred class of solvents is dipolar aprotic solvents. Without being limited, some examples of suitable solvents include dimethyl acetamide, dimethyl formamide, dimethyl sulfoxide, hexamethylphosphoramide or -triamide, acetone acetonitrile, and acetone. This class of solvents has the advantage of solvating ionic group containing monomers and monomers that are not water soluble.

Other solvents found useful are N-propanol and dipropylene glycol. Similar hydroxy containing solvents, such as alcohols, for example isopropanol, butanol; diols such as various glycols, or polyols, such as glycerine may be useful in some cases. These are given as examples, not to be limiting to a practitioner.

The solvents discussed may be used alone or in combination. In some cases, they may be used with water to increase solubility of ionic containing organics.

This allows the membrane developer to have a broad range of monomer mixtures from which to tailor a cross-linked copolymer in order to obtain the optimum balance of properties. By combining a water soluble and/or swellable ion containing monomer with a non-water swelling comonomer, the developer can obtain a copolymer with a high degree of ionic groups and reduced swelling in water desalination use. Such copolymers will have better physical strength in water and suffer less dimensional change in use due to changes in water ionic content or temperature changes.

Earlier attempts to make ion transporting membranes with a porous substrate relied on imbibing a ion-conducting polymer into the pores of the substrate. U.S. Pat. No. 7,550,216 uses a water soluble ion-conducting polymer. In water such polymers are expanded, due to charge repulsion from the similar charges on the monomer units. This will hinder diffusion into the pores of the substrate, and reduce the amount of charge that can be permanently placed into the substrate. The U.S. Pat. No. 7,550,216 patent also shows that water insoluble (i.e., organic solvent solution borne) ion-conducting polymers do not produce satisfactory fuel cell membranes. The process use to make these membranes requires a very long repetitive drying/soaking protocol, which would increase manufacturing costs. Furthermore, the dry/soak steps are needed to fully densify the membrane, which indicates that polymer diffusion does not completely fill the porous regions.

The present inventors have gone beyond the standard requirements of an electrodialysis membrane in the present embodiments. While a mechanically strong membrane having low electrical resistance and high permselectivity are fundamental requirements for a seawater electrodialysis membrane, other characteristics are important in order to obtain the optimum balance of properties.

The inventors of the several embodiments of the invention described herein have also developed ion exchange membranes that have reduced water permeation. Permeation of the dilute flow through membrane defects under the driving force of the osmotic pressure difference between the dilute and concentrated streams is deleterious to high efficiency. Water permeation reduces current efficiencies and purified water productivity by removing pure water. Water loss is particularly severe in seawater electrodialysis with thin membranes because the high concentration difference between the concentrate (brine) side of the membranes and the pure water side of the membrane increases the osmotic driving force. Membrane defects will be particularly detrimental to operation as the high osmotic pressure will force pure water through such defects and increase water loss and increase power consumption.

To reduce water permeation, the inventors developed several methods that may be applied to the membrane production process in order to produce a membrane with minimal defects, preferably essentially no defects. In the Examples, particularly Examples 1 and 2, an apparent optimum soaking time was shown to produce the best combination of membrane properties. In Example 1, soaking times between 6 and 24 hours gave the best combination of low resistivity and high permselectivity. In Example 2, using a different monomer formulation, soaking times of between 1 and 3 hours gave the best combination of these properties. The inventors also found that a procedure involving a double pore filling process reduced apparent defects without greatly affecting resistivity and but improving apparent permselectivity. One or both of these findings may be used in a scaled up process.

Moreover, the crosslinked polymer used to fill the porous substrate was developed to have a structure that allowed high permeability of cations and low osmotic flow. Apparent permselectivity is the ratio of transport rate of counter-ions (cations) to co-ions (anions) but does not indicate the rate of counter-ion removal.

Cation permeability is controlled by the structure of the ion (molecular size and total charge) and by the effect of membrane microstructure. The membrane microstructure can retard counter-ion permeability if it can be thought that the membrane has pores that are "small." This qualitative term means that the counter-ions encounter high resistance from interactions with the membrane material in traversing the membrane, as if they were traversing a tunnel slightly larger than their apparent diameter. The membrane may have a relatively low water content which will reduce the pathways for counter-ion permeability. By balancing the content of hydrophilic monomer to increase counter-ion permeability, with the amount and nature of crosslinking monomer, the water content and effective pore size of the membrane can be optimized. The crosslinking monomer is usually a hydrophobic chemical, but may be chosen to be hydrophilic.

The results of Experiments 1, 2, and 4 illustrate how differences in formulation can affect membrane properties. In the table below some results are abstracted to show this. The formulation is given as weight percent of the reactants. Resistivity and permselectivity are given at the soaking time which gave the best combination of properties, (Sample number in parentheses. As the %2-SEM is decreased, with a constant % of crosslinker (EGDM), the resistivity increases and permselectivity decreases, somewhat more pronounced with the APorous substrate. Note the very low resistivity and high permselectivity of Sample 24.

| Experiment # | % 2-SEM | % NMP | % EGDM | Resistivity Teklon @ hrs | Resistivity APorous @hrs | Apparent Perm (%) Teklon @ hrs | Apparent Perm (%) APorous @hrs |
|---|---|---|---|---|---|---|---|
| 1 | 35 | 35 | 30 | 0.91 (6) | 0.21 (24) | 101.8 (6) | 99.26 (24) |
| 2 | 30 | 40 | 30 | 1.48 (3) | 1.45 (1) | 99.05 (3) | 97.6 (1) |
| 4 | 18 | 52 | 30 | 1.39 (3) | 1.05 (1) | 96.9 (1) | 92.2 (1) |

It is evident from the results presented here that achieving an ED membrane for seawater use is a difficult problem. The inventors have found that certain combinations of membrane-making variables will produce membranes with resistivities of less than 1.0 Ohm-cm2, and in some cases, less than 0.5 Ohm-cm2, and permselectivities of greater than 90%.

In Example 1, a long soaking time, 6-24 hours produces excellent membranes with resistivities of from approximately 0.2 to approximately 1.0 and permselectivities greater than 99%. When the formulation was changed to a higher level of solvent in Example 2, the soak time to produce 99% permselectivity was 0.5-1.0 hours, although resistivity was between 1 and 2 Ohm-cm2.

Table 8 of Example 3 illustrates the use of two different formulations for a two pore filling process. The average values and standard deviation for resistivity are 1.31 Ohm-cm2 (range 0.38-1.72) and 0.481 and for permselectivity, average 97.02% (range 95.77%-98.08%) and standard deviation 0.918. The spread, as calculated from the ratio of standard deviation to average, is larger for resistivity than for the permselectivity, 0.395 vs. 0.0094. This indicates that low values of resistivity combined with high permselectivity are possible (See sample MB) but that it is difficult to control resistivity.

Example 4 is made with a formulation having the highest level of non-reactive solvent (~52% NMP). Here the effect of soak time is not apparent, which indicates that there is a optimal combination solvent content and soak time. Since in these examples the crosslink percentage was constant, this is the same as finding an optimum 2-SEM level, for these particular processing conditions.

Example 5 shows examples of anionic exchange membranes. Table 11 shows examples where supports and crosslinkers were varied. The results show that the type of support plays an important role in the amount of polymer formed in the support (% weight gain). The Celgard(/C) and Durapore(/F) supports have the highest first weight gain for each crosslinker in all cases but one, followed by Ticona(/T). However, the Ticona supported membranes have very high resistivity. (Rows 6, 13, and 18) The PETA crosslinked membranes have high weight gain with the Celgard support, which strangely also had an increased resistivity after the second pore filling. Permselectivity generally increased a few percent after the second pore filling. Weight pick-up and resistivity vary so considerably that no clear understanding of the relation between crosslinker type and support properties was evident. These results show that considerable experimentation would be needed.

The examples in Table 12 give the results of further combinations of supports and formulations. Several have resistivities of less than 0.5 Ohm-cm2 and permselectivities greater than 90%. (several samples of row 2, and rows 3, 4) and resistivities of less than 1.0 Ohm-cm2 and permselectivities greater than 90%. (Rows 13, 32). The PMDETA/VBC and DABCO/VBC adduct based membranes had the highest permselectivities seen in this work for AEM's.

Overall, the combination of the TMAEMC/EDGM formulation and the APorous support seemed to have the best consistency and a good combination of properties.

Example 6 gives results from a continuous machine run using formulations developed from previous experiments discussed above. Table 15 gives the formulations and substrate used. Membrane development had advanced to the stage where a 10-cell prototype module could be used for testing. Results in standard tests are shown in Table 16.

TABLE 16

| Membrane Type | Resistance ($\Omega$-cm$^2$) | Apparent Permselectivity (%) |
|---|---|---|
| Example 6 cation | 0.9163 | 104 |
| Example 6 anion | 0.8132 | 93.5 |
| Commercial cation | ~2.8 | 94 |
| Commercial anion | ~2.8 | 104 |

The voltage required for these membranes at various salt concentrations is shown in FIG. 1. It can be seen that the example membranes require lower voltage than the commercial membranes at the same current density, i.e., are more energy efficient. This is particularly evident at salt concentrations below 5000 ppm. The low resistivity at comparable apparent permselectivities is strong indication of a lack of random defects.

In related example, an experimental production run of one embodiment of the anion membrane of the present invention, using thinner substrate, generated eighteen samples to determine the presence of defects. Apparent permselectivity was used to measure defects in the membrane samples. The data below show a low standard deviation in apparent permselectivity, indicating the absence of random defects.
Mean apparent permselectivity=93.75%
Standard deviation=0.0031
Formulation: TMAEMC 58.1%, EGDM 18.1%, DPG 16.4%, 1-Propanol 6.7%, AIBN 0.7%; Substrate: Teklon, 35 µm, 48% porosity The results discussed for Example 6 are not limiting to the formulations and other process conditions described, but are related here to show one example of exceptional electrodialysis membranes having been developed as a result of prolonged and difficult experimental research.

Further improvement was surprisingly found (data in Table 17) by adding a non-charged neutral monomer to the polymerization formulation. Hydroxyethyl acrylate, hydroxyethylmethacrylate and vinylbenzyl chloride are preferred neutral monomers. The inventors believe that these monomers and similar monomers moderate phase separation and produce a more homogeneous crosslinked polymer. Other example monomers are, for example, but not limited by these examples, methyl methacrylate, ethyl methacrylate, and hydroxypropylacrylate. Table 17 of Example 7 gives results for experiments done with several formulations using two ionogenic monomers (VBTMAC and TMAEMC) and hydroxyethylacryate as the neutral monomer, with divinylbenzene used as crosslinker monomer. The results show consistent values of resistivity below 1 and down to approximately 0.5 Ω-cm². Permselectivities were in the range of 92% to 95%. The preferred support was APorous H6A.

The results further show the importance of choosing the correct support membrane as the APorous support membrane consistently produces membranes with resistivity values less than 1.0, whereas both the Teklon 3 and Solupor16P10A supports give values above 1.

The inventors control membrane properties by balancing the amount of crosslinking formed in the polymerized membrane. In general, a high level of crosslinking gives high permselectivity with concurrent high resistivity. Conversely, too low a crosslinking content will give low resistivity, but low permselectivity. Without desiring to be limited by the following, the inventors also believe that several properties of the polymerization formulation affect the properties of the resultant membrane. The use of a microporous substrate is believed to improve membrane properties by reducing the microheterogeneity formed polymer. This is believed due to the constrained crosslinked polymer formation in the porous volume, possibly enhanced by the surface effects of the hydrophobic pore walls. In the polymerization of an ionogenic monomer (hydrophilic) and a hydrophobic crosslinker, the tendency of the hydrophobic and hydrophilic regions will be to separate and aggregate. Even with hydrophilic crosslinkers, such as ethyleneglycoldimethacrylate, the inventors see evidence of phase separation when a film of solution is applied to a dense substrate film, for example, a polyethyleneterepthalate film, as the applied solution becomes cloudy as solvent is removed. The inventors believe that the improved combination of low resistivity and high apparent permselectivity is in part due to the retarded motion engendered by the microporous dimensions of the pores and possibly aided by the hydrophobic attraction of the pore walls.

The conclusion shown by these examples is that membranes with goal properties of less than 1.0 Ohm-cm2 or more preferably 0.5 Ohm-cm2 and greater than 90% permselectivity can be made. For CEM's, permselectivities greater than 99% have been shown with similar goal resistivities. The experimental work shows that proper choice of support is important, but that different formulations combine differently with supports so that a general choice cannot be made. Process variables such as soaking time are also important. A practitioner skilled in the art of membrane development and particularly ED membrane development will be able to use these examples and the teachings herein to make membranes having goal properties with the use of standard experimental procedures and without undue experimentation.

EXPERIMENTAL EXAMPLES

The following examples are meant to illustrate the extent of effort expended in developing the subject membranes. The finding resulted in showing that ion exchange membranes having the desired properties could be made and that improvements are possible with further experimentation. These results are meant to be illustrative and to indicate developmental directions to those skilled in the art of membrane development and associated arts and not to be limiting as to the extent of the matter disclosed herein. Properties and suppliers of the supports used are given in Table 1 below.

TABLE 1

Support materials
Support webs used

| Abbreviation | Trade name | Manufacturer | Material | Rated pore size | Thickness microns | Porosity % |
|---|---|---|---|---|---|---|
| APH6A | APorous H6A | APorous Billerica MA | HDPE | 0.1 | 52 | 68 |
| APS14 | APorous S14 | | HDPE | 0.1 | 84 | 77 |
| APH5A | APorous H5A | | HDPE | | | |
| APG11HN | APorous G11HN | | HDPE | 0.1 | 22 | 57 |
| T32 | Ticona 32 | Ticona Engineering Polymers Auburn Hills MI | UHMWPE | | | |
| T25 | Ticona 25 | | | | 25 | |
| F | Durapore GVPP | Millipore Billerica MA | PVDF | 0.2 | 75-120 | 75 |
| Tk | Teklon HPIP32 | Entek Lebanon, OR | UHMWPE | | 32 | 48 |
| D5 | Dewal 50 | Dewal Industries Saunderstown, RI | UHMWPE | | | |
| D2 | Dewal 20 | | UHMWPE | | | |
| C47 | Celgard 47 | CELGARD Charlotte NC | PP | | | |
| C2402 | Celgard 2402 | | PP | | 32 | 45 |
| S16P5A | Solupor 16P5A | Lydall Filtration Rochester NH | | 0.5 | 60 & 115 | 83% & 85% |
| S15P10A | Solupor 16P10A | | | 0.9 | 120 | 85% |

TABLE 1-continued

Support materials
Support webs used

| Abbreviation | Trade name | Manufacturer | Material | Rated pore size | Thickness microns | Porosity % |
|---|---|---|---|---|---|---|
| EZ2090 | Celgard | Celgard | PP | 0.097 | 20 | 64% |
| EZ2590 | Celgard | Celgard | PP | 0.1 | 20 | 66% |

Example 1

A treatment solution was formulated from an ionic sulfonated methacrylate-2-sulfoethyl methacrylate (2-SEM; CAS#10595-80-9), Ethylene glycoldimethacrylate (EGDM; CAS#97-90-5, with a non-reactive solvent N-methyl pyrrolidone (NMP; CAS#873-50-4) and polymerization free radical initiator 2,2-azobisisobutyrnitrile (AIBN; CAS #78-67-1) VAZO-64 DuPont. The formulation was made up to;

TABLE 2

Example 1 Formulation

| 2-SEM | EGDM | NMP | VAZO 64 |
|---|---|---|---|
| 12.51 grams | 5.37 grains | 9.63 grams | 0.1895 grams |

TABLE 3

Example 1 Substrates used;

| Type | Manufacturer | Material | Rated pore size (micron) | Thickness (microns) | Porosity (%) |
|---|---|---|---|---|---|
| APorous H6A | APorous Inc | UHMWPE | 0.1 | 52 | 68 |
| Teklon HPIP32 | Entek | UHMWPE | | 32 | 48 |

Membrane coupons were made up by the aluminum boat method described in the Detailed Description section. Soaking time, the time that the substrate was in the formulation before polymerization was initiated, was varied. Resistivity and permselectivity results are given in Table 4.

TABLE 4

Example 1 results

| Membrane type | Substrate | Soaking time (hrs) | R (Ohm · cm2) | Apparent Permselectivity (%) |
|---|---|---|---|---|
| CEM (2-SEM//EGDM) | Teklon | 0.25 | 1.345 | 102.41 |
| CEM (2-SEM/EGDM) | Teklon | 0.5 | 1.118 | 98.55 |
| CEM (2-SEM/EGDM) | Teklon | 1 | 1.163 | 96.09* |
| CEM (2-SEM/EGDM) | Teklon | 3 | 1.532 | 100.04 |
| CEM (2-SEM/EGDM) | Teklon | 6 | 0.272 | 99.67 |
| CEM (2-SEM/EGDM) | Teklon | 24 | 0.914 | 101.81 |
| CEM (2-SEM/EGDM) | Teklon | 48 | 1.195 | 100.08 |
| CEM (2-SEM//EGDM) | APorous H6A | 0.25 | 2.029 | 97.41 |
| CEM (2-SEM/EGDM) | APorous H6A | 0.5 | 1.422 | 100.69 |
| CEM (2-SEM/EGDM) | APorous H6A | 1 | 1.063 | 97.24** |
| CEM (2-SEM/EGDM) | APorous H6A | 3 | 1.646 | 97.24 |
| CEM (2-SEM/EGDM) | APorous H6A | 6 | 1.015 | 99.92 |
| CEM (2-SEM/EGDM) | APorous H6A | 24 | 0.210 | 99.26 |
| CEM (2-SEM/EGDM) | APorous H6A | 48 | 1.169 | 99.10 |

(all single pore-filling)
*some white spots;
**A large white area.

Example 2

A treatment solution was formulated from an ionic sulfonated methacrylate-2-sulfoethyl methacrylate (2-SEM; CAS#10595-80-9), Ethylene glycoldimethacrylate (EGDM; CAS#97-90-5, with a higher percent of non-reactive solvent N-methyl pyrrolidone (NMP; CAS#873-50-4) and polymerization free radical initiator 2,2-azobisisobutyrnitrile (AIBN; CAS #78-67-1) VAZO-64 DuPont. The formulation was made up to (weight percentages);

TABLE 5

Example 2 formulation

| 2-SEM (grams) | EGDM(grams) | NMP(grams) | VAZO 64(grams) |
|---|---|---|---|
| 12.53 | 6.32 | 11.94 | 0.1895 |

TABLE 6

Substrates used in example 2

| Type | Manufacturer | Material | Rated pore size (micron) | Thickness (microns) | Porosity (%) |
|---|---|---|---|---|---|
| APorous H6A | APorous Inc | UHMWPE | 0.1 | 52 | 68 |
| Teklon HPIP32 | Entek | UHMWPE | | 32 | 48 |

Membrane coupons were made up by the aluminum boat method described in the Detailed Description section. Soaking time, the time that the substrate was in the formulation before polymerization was initiated, was varied. Resistivity and permselectivity results are given in Table 2.

TABLE 7

Example 2 results.

| Membrane type | Substrate | Soaking time (hrs) | R (Ohm · cm2) | App. Permselectivity (%) |
|---|---|---|---|---|
| CEM (2-SEM//EGDM) | Teklon | 0.25 | 1.115 | 95.19 |
| CEM (2-SEM/EGDM) | Teklon | 0.5 | 1.731 | 100.79 |
| CEM (2-SEM/EGDM) | Teklon | 1 | 2.141 | 96.16 |
| CEM (2-SEM/EGDM) | Teklon | 3 | 1.475 | 99.05 |
| CEM (2-SEM/EGDM) | Teklon | 6 | 1.600 | 95.52 |
| CEM (2-SEM/EGDM) | Teklon | 30 | 1.658 | 95.02* |
| CEM (2-SEM/EGDM) | Teklon | 48 | 1.102 | 94.70 |
| CEM (2-SEM/EGDM) | Teklon | 48 | 1.900 | 93.54** |
| CEM (2-SEM//EGDM) | APorous H6A | 0.25 | 0.724 | 92.22 |
| CEM (2-SEM/EGDM) | APorous H6A | 0.5 | 1.641 | 99.97 |
| CEM (2-SEM/EGDM) | APorous H6A | 1 | 1.451 | 97.66 |
| CEM (2-SEM/EGDM) | APorous H6A | 3 | 1.054 | 96.60 |
| CEM (2-SEM/EGDM) | APorous H6A | 6 | 1.801 | 95.02 |
| CEM (2-SEM/EGDM) | APorous H6A | 30 | 0.579 | 90.54** |
| CEM (2-SEM/EGDM) | APorous H6A | 48 | 2.412 | 96.67*** |
| CEM (2-SEM/EGDM) | APorous H6A | 48 | 2.047 | 93.54** |

*One white spot;
**many white spots;
***resin sticked on surface

This batch of 2-SEM/EGDM/NMP@40% NP formulation showed behavior consistent with solution instability which appeared after overnight soaking.

Follow-On Examples

TABLE 6A

Formulation

| 2-SEM (grams) | EGDM(grams) | NMP(grams) | AIBN grams |
|---|---|---|---|
| 7.30 | 2.72 | 2.87 | 0.104 |

| Membrane type | Substrate | Pore fillings | R (Ohm · cm2) | App. Permselectivity (%) |
|---|---|---|---|---|
| CEM (2-SEM/EGDM) | CelgardEZ2590 | 1 | 1.294 | 97.87 |
| CEM (2-SEM/EGDM) | AP H6A | 1 | 1.456 | 99.17 |
| CEM (2-SEM/EGDM) | Solupor16P10A | 2 | 1.941 | 102.4 |
| CEM (2-SEM/EGDM) | Solupor 16P5A | 2 | 2.159 | 102.0 |

Example 3

TABLE 7

Formulations for example 3

| | 2-SEM (grams) | EGDM (grams) | NMP (grams) | VAZO 64 (grams) |
|---|---|---|---|---|
| 186-76-2 | 63.2 | 28.0 | 49.0 | 0.998 |
| 186-77-2 | 21.0 | 10.0 | 18.0 | 0.31 |

A sample of Teklon (25"×25") was saturated with 186-76-2 formulation for 1.5 hours. Then a second formulation was made (186-77-2) and the saturated Teklon (25"×25") was soaked in 186-77-2 for another hour.

Then it was placed on a large piece of PET film, smoothed out to remove air bubbles, and the soaked Teklon folded over itself twice into a narrower strip. Air bubbles were again removed by smoothing the folded Teklon. The four-folded Teklon strip was then covered with another piece of PET, and any air bubbles smoothed out. Rolled the Teklon/PET sandwich up into a 4" diameter cylinder and cured in an 80° C. oven for 1 hour. The 25"×25" CEM thus made was conditioned overnight in 0.5 N NaCl.

Table 8 shows resistivity and permselectivity measurements of the 9 coupons die cut from the 25"×25" CEM.

TABLE 8

Example 3 results

| Results: | Resistivity (ohm cm2) | App. Permselectivity (%) |
|---|---|---|
| Right Top (RT): | 1.7244 | 97.75 |
| Right Middle(RM): | 1.6989 | 95.77 |
| Right Bottom(RB): | 1.6159 | 96.76 |
| Middle Top(MT): | 1.3933 | 98.08 |
| Middle Middle(MM): | 0.9453 | 96.27 |
| Middle Bottom(MB): | 0.3768 | 95.77 |
| Left Top (LT): | 1.5462 | 97.91 |
| Left Middle(LM): | 1.7167 | 97.75 |
| Left Bottom(LB): | 0.8558 | 97.09 |
| Ave | 1.31 | 97.02 |
| Std Dev | 0.481 | 0.918 |
| StdDev/Ave | 0.395 | 0.0094 |

Example 4

This set of samples was made with the formulation below in the usual manner. Results are shown in Table 9.

TABLE 9

Formulation for Example 4

| 2-SEM(grams) | EGDM(grams) | NMP(grams) | VAZO64(grams) |
|---|---|---|---|
| 60.22 | 25.81 | 70.78 | 0.86 |

TABLE 10

Example 4 results

| Membrane type | Substrate | Soaking time (hrs) | R (Ohm · cm2) | App. Permselectivity (%) |
|---|---|---|---|---|
| Astom CMX | | | 3.211 | 104.92 |
| CEM (AMPS//EGDM) | Teklon | 0.25 | 0.6774 | 93.71 |
| CEM (AMPS/EGDM) | Teklon | 0.5 | 1.0454 | 89.91 |
| CEM (AMPS/EGDM) | Teklon | 1 | 1.1092 | 94.86 |
| CEM (AMPS/EGDM) | Teklon | 3 | 1.3873 | 96.92 |
| CEM (AMPS/EGDM) | Teklon | 6 | 1.2506 | 95.19 |
| CEM (AMPS/EGDM) | Teklon | 24 | 1.0877 | 94.61 |
| CEM (AMPS/EGDM) | Teklon | 48 | 1.8887 | 94.12 |
| CEM(AMPS/2-SEM/EGDM/HOEMA*) | Teklon | 1 | 1.48 | 100 |
| CEM(AMPS/2-SEM/EGDM/HOEMA*) | AP H6A | 1 | 2.09 | 96.05 |
| CEM (AMPS/EGDM) | APorous H6A | 0.25 | 1.4805 | 93.71 |
| CEM (AMPS/EGDM) | APorous H6A | 0.5 | 0.9379 | 91.73 |
| CEM (AMPS/EGDM) | APorous H6A | 1 | 1.0487 | 92.22 |
| CEM (AMPS/EGDM) | APorous H6A | 3 | 1.1669 | 91.15 |
| CEM (AMPS/EGDM) | APorous H6A | 6 | 2.3513 | 91.73 |
| CEM (AMPS/EGDM) | APorous H6A | 24 | 0.5015 | 91.31 |
| CEM (AMPS/EGDM) | APorous H6A | 48 | 1.6426 | 92.78 |

A related experiment was conducted with a neutral monomer HOEMA (Hydroxyethylmethacrylate). The solution composition is given in Table 9A. Membrane results are given in Table 10A.

TABLE 9A

| AMPS | 2-SEM | EGDM | HOEMA | NMP | AIBN | Support |
|---|---|---|---|---|---|---|
| 10 gr | 28 gr | 10 gr | 1.10 gr | 15 gr | 0.35 gr | Teklon |
| 10 gr | 28 gr | 10 gr | 1.10 gr | 15 gr | 0.35 gr | Ap H6A |

TABLE 10A

| Membrane type | Substrate | Soaking time (hrs) | R (Ohm · cm2) | App. Permselectivity (%) |
|---|---|---|---|---|
| CEM(AMPS/2-SEM/EGDM/HOEMA*) | Teklon | 1 | 1.48 | 100 |
| CEM(AMPS/2-SEM/EGDM/HOEMA*) | AP H6A | 1 | 2.09 | 96.05 |

Example 5

A series of experiments were conducted varying the crosslinker type and support used to make anionic exchange membranes. Results are shown in Table 11. All formulations were 16.1% TMAEMC, 6.8% DPG, 3.6% N-propanol, 18.8% cross-linker, and 0.6% VAZO. The formulation in the Coating Formulation/Support column is named for the cross-linker used.

TABLE 11

Results for Example 5

| | Coating Formulation/Support | % wgt gain $1^{st}$ pore filling | % wgt gain $2^{nd}$ pore filling | Resistivity $1^{st}$ pore filling | Resistivity $2^{nd}$ pore filling | Apparent Permselectivity % $1^{st}$ pore filling | Apparent Permselectivity % $2^{nd}$ pore filling |
|---|---|---|---|---|---|---|---|
| 1 | 13BGDM/C | 76.4 | 14.5 | 1.89 | 2.01 | 87.6 | 93.0 |
| 2 | 13BGDM/C | 76.1 | 25.3 | 1.62 | 2.28 | 90.4 | 92.3 |
| 3 | 13BGDM/D2 | 17.8 | 6.6 | 9.03 | 8.90 | 90.4 | 92.3 |
| 4 | 13BGDM/D5 | 19.8 | 5.9 | 19.9 | 18.73 | 90.5 | 93.7 |
| 5 | 13BGDM/F | 80.0 | 64.9 | 1.03 | 1.84 | 89.4 | 78.8 |
| 6 | 13BGDM/T | 50.0 | −.6 | 56.2 | 39.0 | 87.0 | 86.7 |
| 7 | PETA/C | 183.7 | 5.3 | 1.83 | 62.0 | 89.0 | 89.2 |
| 8 | PETA/C | 342.8 | 4.9 | 1.73 | 215 | 88.1 | 86.2 |
| 9 | PETA/D2 | 16.7 | 4.1 | 9.24 | 9.06 | 90.2 | 92.0 |
| 10 | PETA/D2 | 18.6 | 3.9 | 8.78 | 8.36 | 90.2 | 93.0 |
| 11 | PETA/D5 | 35.8 | 2.0 | 21.4 | 25.8 | 90.2 | 92.4 |
| 12 | PETA/F | 108.8 | 6.0 | 1.51 | — | 86.5 | — |
| 13 | PETA/T | 43.5 | −6.0 | 77.2 | 39.0 | 87.0 | 86.7 |
| 14 | TMPTA/C | 100.9 | −2.7 | 2.18 | 1.98 | 87.4 | 91.4 |
| 15 | TMPTA/C | 183.2 | −44.6 | 1.53 | 35.7 | 86.8 | 94.3 |
| 16 | TMPTA/D2 | 17.0 | −3.8 | 7.69 | 7.20 | 90.9 | 93.1 |
| 17 | TMPTA/D5 | 36.6 | −13.7 | 20.3 | 22.9 | 91.7 | 92.2 |
| 18 | TMPTA/T | 49.7 | −16.4 | 85.1 | 51.1 | 88.0 | 89.3 |
| 19 | TMPTA/F | 21.7 | | 1.06 | | 83.4 | |

A series of further experiments were conducted on several supports utilizing formulations of varying monomer/cross-linker combinations. Formulation details are given in Table 12.

TABLE 12

Further results

| | Support | Formulation | Pore fillings used | Resistivity Ohm-cm$^2$ | Apparent Permselectivity % |
|---|---|---|---|---|---|
| 1 | APH6A | TMAEMC/25% EGDM | 2 | 1.48 | 92.2 |
| 2 | APH6A | TMAEMA/30% EGDM | 2 | 1.07 (ave of 14) Range (.2-1.84) | 92.9(ave of 14) Range 92.2-94.2 |
| 3 | APH6A | GMA/DMEDA/EGDM/EI | 1 | 0.49 | 91.0 |
| 4 | APH6A | TMAEMC/28% EDGM | 1 | 0.272 | 91.9 |
| 5 | APH5A | PMDETA/VBC | 1 | | |
| 6 | APS14 | TMAEMC/25% EGDM | 2 | 1.15 | 89.6 |
| 7 | APS14 | TMAEMC/29% EGDM | 1 | 1.37 | 90.1 |
| 8 | APG11HN | TMAEMC/29% EGDM | 1 | 0.683 | 91.8 |
| 9 | T32 | TMAEMC/23% EGDM | 2 | 3.45 | 93.7 |
| 10 | T32 | TMAEMC/15% EGDM | 2 | .49 | 88.9 |
| 11 | T32 | DABCO/VBC | 1 | 2.73 | 94.5 |
| 12 | T32 | PMDETA/VBC | 2 | 5.44 | 94.4 |
| 13 | T25 | APTMAC/9% EGDM | 2 | 0.81 | 90.1 |
| 14 | T25 | PMDETA/VBC | 2 | 5.2 | 83.8 |

TABLE 12-continued

Further results

| | Support | Formulation | Pore fillings used | Resistivity Ohm-cm² | Apparent Permselectivity % |
|---|---|---|---|---|---|
| 15 | Tk32 | DABCO/VBC | 1 | 1.53 | 91.1 |
| 16 | Tk32 | DABCO/VBC | 1 | 1.65 | 92.5 |
| 17 | Tk32 | PMDETA/VBC | 2 | 2.82 | 94.6 |
| 18 | Tk32 | PMDETA/VBC | 2 | 3.68 | 94.4 |
| 19 | Tk32 | GMA/DMEDA/EI | 1 | 1.81 | 91.5 |
| 20 | D 50str | TMAEMC/EGDM | 2 | 3.18 | 93.3 |
| 21 | D 50str | PMDETA/VBC | 2 | 15.03 | 91.9 |
| 22 | D 50str | PMDETA/VBC | 2 | 8.03 | 86.7 |
| 23 | D50 | DABCO/VBC | 1 | 14.98 | 91.4 |
| 24 | D50 | DABCO/VBC | 1 | 13.3 | 92.3 |
| 25 | D125 | PMDETA/VBC | 2 | 43.69 | 94.6 |
| 26 | C32 | PMDETA/VBC | 2 | 3.60 | 94.3 |
| 27 | C47 | PMDETA/VBC | 2 | 12.59 | 94.1 |
| 28 | C2402 | TMAEMA/EGDM | 2 | 1.13 | 92.4 |
| 29 | C2402 | PMDETA/VBC | 2 | 3.58 | 94.3 |
| 30 | S16P5A | GMA/DMEDA/EGDM/EI | 1 | 1.43 | 88.2 |
| 31 | S16P5A | GMA/DMEDA/EGDM/EI | 1 | 2.02 | 88.7 |
| 32 | S16P5A | TMAEMC/EGDM | 1 | 0.69 | 91.8 |
| 33 | S16P10A | GMA/DMEDA/EGDM/EI | 1 | 1.24 | 87.3 |
| 34 | S16P10A | TMAEMC/EGDM | 1 | 1.35 | 90.8 |

Formulations for the examples of Table 12 are given below. Table 14 has the abbreviations used.

TABLE 13

(Component recorded in order given in first column)

| | Formulation | Component/Wgt (Grams) | | | | |
|---|---|---|---|---|---|---|
| 1 | TMAEMC/25% EGDM/NMP/propanol | 5.02 | 1.68 | 1.45 | 0.72 | |
| 2 | TMAEMA/30% EGDM/DPG/propanol | 14 | 4.8 | 3.3 | 0.7 | |
| 3 | GMA/DMEDA/EGDM/EI/DPG/propanol | 14.97 | 2.38 | 3.95 | 7.88 | 7.28/2.73 |
| 4 | TMAEMC/29% EGDM/DPG/Propanol | 46 | 15 | 10 | 2 | |
| 5 | PMDETA/VBC/NMP | 2.43 | 6.37 | 6.18 | | |
| 6 | TMAEMC/25% EGDM/NMP/Propanol | 5.02 | 1.68 | 1.45 | 0.72 | |
| 7 | TMAEMC/29% EGDM/DPG/Propanol | 46 | 15 | 10 | 2 | |
| 8 | TMAEMC/29% EGDM/DPG/Propanol | 46 | 15 | 10 | 2 | |
| 9 | TMAEMC/23% EGDM/DPG/Propanol | 20.1 | 5.2 | 10.7 | 5 | |
| 10 | TMAEMC/15% EGDM/DPG/Propanol | 14 | 2.4 | 3.3 | 0.7 | |
| 11 | DABCO/VBC/DPG | 2.38 | 6.35 | 6.25 | | |
| 12 | PMDETA/VBC/NMP | 2.43 | 6.37 | 6.18 | | |
| 13 | APTMAC/9% EGDM/DPG/propanol/water | 4.35 | 0.32 | 1.82 | 0.59 | 1.08 |
| 14 | PMDETA/VBC/NMP | 2.43 | 6.37 | 6.18 | | |
| 15 | DABCO/VBC/DPG | 2.38 | 6.35 | 6.25 | | |
| 16 | DABCO/VBC/DPG | 2.38 | 6.35 | 6.25 | | |
| 17 | PMDETA/VBC/NMP | 2.43 | 6.37 | 6.18 | | |
| 18 | PMDETA/VBC/NMP | 2.43 | 6.37 | 6.18 | | |
| 19 | GMA/DMEDA/EDGM/EI/DPG/propanol | 14.97 | 2.38 | 3.95 | 7.88 | 7.28/2.73 |
| 20 | TMAEMC/EGDM 15%/DPG/Propanol | 14. | 2.4 | 3.3 | 0.7 | |
| 21 | PMDETA/VBC/NMP | 2.43 | 6.37 | 6.18 | | |
| 22 | PMDETA/VBC/NMP | 2.43 | 6.37 | 6.18 | | |
| 23 | DABCO/VBC/DPG | 2.38 | 6.35 | 6.25 | | |
| 24 | DABCO/VBC/DPG | 2.38 | 6.35 | 6.25 | | |
| 25 | PMDETA/VBC/NMP | 6.37 | 2.43 | 6.18 | | |
| 26 | PMDETA/VBC/NMP | 6.37 | 2.43 | 6.18 | | |
| 27 | PMDETA/VBC/NMP | 6.37 | 2.43 | 6.18 | | |
| 28 | TMAEMD/EGDM/DPD/propanol | 46 | 15 | 10 | 2 | |
| 29 | PMDETA/VBC/NMP | 6.37 | 2.43 | 6.18 | | |
| 30 | GMA/DMEDA/EGDM/EI/DPG/propanol | 14.97 | 2.38 | 3.95 | 7.88 | 7.28/2.73 |
| 31 | GMA/DMEDA/EGDM/EI/DPG/propanol | 14.97 | 2.38 | 3.95 | 7.88 | 7.28/2.73 |
| 32 | TMAEMC/EGDM/DPG/Propanol | 46 | 15 | 10 | 2 | |
| 33 | GMA/DMEDA/EGDM/EI/DPG/propanol | 14.97 | 2.38 | 3.95 | 7.88 | 7.28/2.73 |
| 34 | TMAEMC/EGDM/DPG/Propanol | 46 | 15 | 10 | 2 | |

TABLE 14

Abbreviations used

| | Abbreviation |
|---|---|
| Monomers/chemicals | |
| Trimethylammoniumethylmethacrylic chloride(80% (w/w) in water) | TMAEMC |
| 3-acrylamidopropyl)trimethylammonium chloride(75% (w/w) in water) | APTMAC |
| 1,4-diazabicyclo[2,2,2]octane di(vinylbenzyl chloride) (a quaternary salt of 1,4-diazabicyclo[2,2,2]octane (DABCO) and vinylbenzyl chloride | DABCO/VBC |
| N,N,N',N',N''-pentamethyldiethylenetriamine di(vinylbenzyl chloride (a quaternary salt of N,N,N',N',N''-pentamethyldiethylenetriamine and vinylbenzyl chloride) | PMDETA/VBC |
| Glycidyl methacrylate/trimethylamine reaction product | GMA/TMA |
| Glycidyl methacrylate/N,N-dimethylethylenediamine reaction product | GMA/DMEDA |
| Vinylbenyl trimethylammonium chloride | VBTMAC |
| Hydroxyethylacrylate | HOEA |
| Divinyl benzene | DVB |
| Ethyl Iodide | EI |
| Dipropylene glycol | DPG |
| Crosslinking multifunctional monomers | |
| Ethyleneglycol dimethacrylate | EGDM |
| 1,3-butanediol dimethacrylate | 1,3 BGDM |
| pentaerythritol triacrylate | PETA |
| trimethylolpropane triacrylate | TMPTA |
| glycidylmethacrylate | GMA |
| Divinyl benzene | DVB |

Example 6

Further evidence of essentially defect-free membranes is shown in the comparison of this Example. Membranes made according to the description described herein were compared to a thicker (120-160 μm) commercial electrodialysis membranes. The formulation used for these membranes is given in Table 14.

TABLE 15

Results and discussion of Example 6

| Membrane | Component 1 | Component 2 | Component 3 | Component 4 | Component 5 | Substrate |
|---|---|---|---|---|---|---|
| Cation | 2-SEM 41.5% | EGDM 18.2% | NMP 39.8% | AIBN 0.6% | | Aporous 52 μm 61% porosity |
| Anion | TMAEMC 58.1% | EGDM 18.1% | DPG 16.4% | 1-Propanol 6.7% | AIBN 0.7% | Aporous 52 μm 61% porosity |

These membranes were tested in a ten cell electrodialysis module at a current density 88 A/m². Results shown below illustrate the lower resistivity at comparable apparent permselectivities. The feed solution made up with NaCl, which has been found to be a good laboratory stand-in for seawater.

Invented Membrane Properties:
    Cation, mean resistance=0.9163 Ω-cm², Standard deviation=0.42 Ω-cm²; average apparent permselectivity=104%
    Anion: mean resistance=0.8132 Ω-cm², Standard deviation=0.35 Ω-cm²; average apparent permselectivity=93.5%

Commercial Membrane Properties:
    Cation: resistance=~2.8 Ω-cm², apparent permselectivity=94%
    Anion: resistance=~2.8 Ω-cm², apparent permselectivity=104%

Example 7

TABLE 17

Formulation components and amounts (grams)

| VBTMAC | HOEA | TMAEMC | DVB | H2O | N-propanol | DPG | Sample# | Support | Resist (Corrected) | Apparent Permselectivity (%) |
|---|---|---|---|---|---|---|---|---|---|---|
| 3.66 | 1.00 | 1.59 | 1.04 | 0.23 | 0.50 | 0.83 | 1 | APH6a | 0.781 | 92.2 |
| 3.66 | 1.00 | 1.59 | 1.04 | 0.23 | 0.50 | 0.83 | R1 | APH6a | 0.649 | |
| 3.66 | 1.00 | 1.59 | 1.04 | 0.23 | 0.50 | 0.83 | 2 | APH6a | 0.609 | 92.05 |
| 3.66 | 1.00 | 1.59 | 1.04 | 0.23 | 0.50 | 0.83 | R2 | APH6a | 0.676 | |
| 3.66 | 1.00 | 1.59 | 1.17 | 0.23 | 0.50 | 0.83 | 3 | APH6a | 0.638 | 92.6 |
| 3.66 | 1.00 | 1.59 | 1.04 | 0.23 | 0.50 | 0.83 | S1 | APH6a | 0.364 | 92.4 |
| 3.66 | 1.00 | 1.59 | 1.04 | 0.23 | 0.50 | 0.83 | RS1 | APH6a | 0.507 | |
| 3.66 | 1.00 | 1.59 | 1.04 | 0.23 | 0.50 | 0.83 | R2 | APH6a | 0.599 | 92.6 |
| 3.66 | 1.00 | 1.59 | 1.17 | 0.23 | 0.50 | 0.83 | 4 | APH6a | 0.524 | 93.1 |
| 3.66 | 1.00 | 1.59 | 1.17 | 0.23 | 0.50 | 0.83 | R4 | APH6a | 0.633 | |
| 3.66 | 1.00 | 1.59 | 1.17 | 0.23 | 0.50 | 0.83 | R3 | APH6a | 0.551 | 93.6 |
| 3.66 | 1.00 | 1.59 | 1.17 | 0.23 | 0.50 | 0.83 | R3 | APH6a | 0.504 | |
| 3.66 | 1.00 | 1.59 | 1.36 | 0.23 | 0.50 | 0.83 | 5 | APH6a | 0.797 | 94.8 |
| 3.66 | 1.00 | 1.59 | 1.36 | 0.23 | 0.50 | 0.83 | R5 | APH6a | 0.769 | |
| 3.66 | 1.00 | 1.59 | 1.36 | 0.23 | 0.50 | 0.83 | 6 | APH6a | 0.838 | 94.4 |
| 3.66 | 1.00 | 1.59 | 1.36 | 0.23 | 0.50 | 0.83 | 7 | APH6a | 0.7286 | 93.9 |
| 3.66 | 1.00 | 1.59 | 1.36 | 0.23 | 0.50 | 0.83 | R7 | APH6a | 0.8989 | |
| 3.66 | 1.00 | 1.59 | 1.36 | 0.23 | 0.50 | 0.83 | 8 | APH6a | 0.7354 | 94.9 |
| 3.66 | 1.00 | 1.59 | 1.36 | 0.23 | 0.50 | 0.83 | R7* | APH6a | 0.5175 | 93.6 |
| 3.66 | 1.00 | 1.59 | 1.36 | 0.23 | 0.50 | 0.83 | 9 | APH6a | 0.7627 | 93.1 |
| 3.66 | 1.00 | 1.59 | 1.36 | 0.23 | 0.50 | 0.83 | 10 | APH6a | 0.5699 | 92.6 |
| 3.66 | 1.00 | 1.59 | 1.36 | 0.23 | 0.50 | 0.83 | R8 | APH6a | 0.9601 | 94/1 |
| 3.66 | 1.00 | 1.59 | 1.36 | 0.23 | 0.50 | 0.83 | 11 | TK | 1.4240 | 94.8 |
| 3.66 | 1.00 | 1.59 | 1.36 | 0.23 | 0.50 | 0.83 | 12 | TK | 1.3180 | 94.8 |
| 3.66 | 1.00 | 1.59 | 1.36 | 0.23 | 0.50 | 0.83 | R11 | TK | 1.5697 | |
| 3.66 | 1.00 | 1.59 | 1.36 | 0.23 | 0.50 | 0.83 | R12 | TK | 1.4300 | 95.00 |

TABLE 17-continued

Formulation components and amounts (grams)

| VBTMAC | HOEA | TMAEMC | DVB | H2O | N-propanol | DPG | Sample# | Support | Resist (Corrected) | Apparent Permselectivity (%) |
|---|---|---|---|---|---|---|---|---|---|---|
| 3.66 | 1.00 | 1.59 | 1.36 | 0.23 | 0.50 | 0.83 | R12 | TK | 1.4279 | 95.08 |
| 3.66 | 1.00 | 1.59 | 1.36 | 0.23 | 0.50 | 0.83 | R11 | TK | 1.1856 | 95.2 |
| 3.66 | 1.00 | 1.59 | 1.36 | 0.23 | 0.50 | 0.83 | 13 | Sp | 2.1128 | 93.9 |
| 3.66 | 1.00 | 1.59 | 1.36 | 0.23 | 0.50 | 0.83 | 14 | TK | 1.4604 | 95.2 |
| 3.66 | 1.00 | 1.59 | 1.36 | 0.23 | 0.50 | 0.83 | 15 | AP H6A | 0.76 | 94.08 |
| | | | | | Commercial membrane | | | | 2.77 | 92.3 |

Further improvement was surprisingly found by adding a non-charged neutral monomer to the polymerization formulation. Hydroxyethyl acrylate and vinylbenzyl chloride are preferred monomers. The inventors believe that these monomers, and similar monomers moderate phase separation and produce a more homogeneous crosslinked polymer. Other examples of neutral monomers are, for example, but not limited by these examples, glycidylmethacrylate, methyl methacrylate, ethyl methacrylate, hydroxyethylmethacrylate, hydroxypropylmethacrylate, hydroxypropylacrylate and vinylbenzyl chloride and the like.

Experiment Procedures for Membrane Area Resistivity and Apparent Permselectivity Characterization The membrane resistance and counter ion transport number (permselectivity) can be measured using an electrochemical cell. This bench top experiment provides us with a very effective and quick experiment using a small piece of sample. The equipment and procedure are described here.

Experiment Preparation (1) Solartron 1280 Electrochemical Measurement Unit

The Solartron 1280 electrochemical measurement unit enables us to apply a current between the two platinum electrodes on the two sides of the cell and to measure the voltage drop across membrane. It has 4 connectors: work electrode (WE), counter electrode (CE), Reference electrodes (RE1 and RE2). The CE and WE are used to apply current and RE1 and RE2 to measure the voltage drop.

(2) Reference Electrodes

Reference electrodes (see the insert in FIG. 1) used for membrane characterization are made in R&D lab. ¼" glass tubing is softened, then bent and drawn to the form shown. A porous plug is inserted in the tip to control solution flow to a low rate.

Silver/silver chloride wire is freshly made for each day's testing. A current of 2-3 mA was supplied and controlled by a power supplier and an ampere meter to a platinum wire cathode and silver wire anode immersed in a 0.1N HCl solution. After several minutes, the sliver wire starts to turn black, indicating the formation of AgCl layer on the surface. The solution used inside the reference electrode tubing is 1.0M KCl solution. Since the solution will leak through the porous tip, constant addition of KCl is a necessary (~every 20 min) during experiment.

(3) Membrane Test Cell

Figure 2:
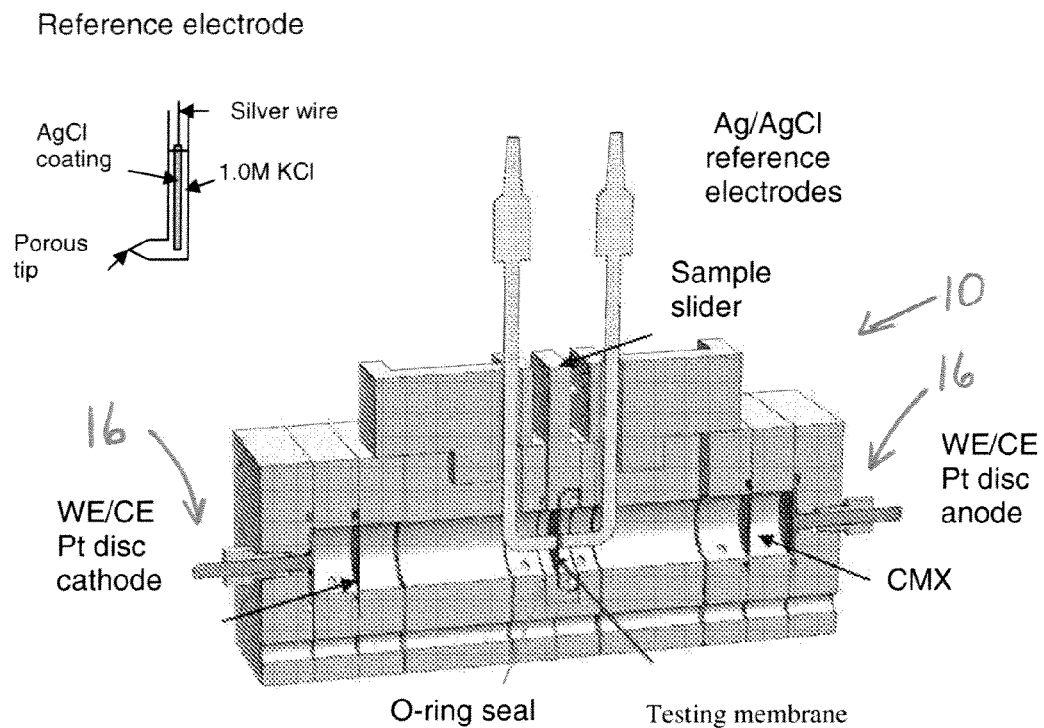
FIG. 2 shows the construction of the membrane test cell and the reference electrode.

FIG. 2 shows the detailed electrochemical testing cell 10 construction used for the experiment to measure resistance and counter ion permselectivity of the membrane. The membranes are cut into disc using a die cutter. The reference electrodes are used to monitor the voltage drop across the testing membrane 14 and the two platinum discs 16 are used to provide a current through the membrane. The cylindrical path of the cell 10 has a cross section area of approximately 7.0 $cm^2$ (4) Solutions All the solutions need to be prepared with quantitative level as indicated by their significant figures. These includes 0.500N NaCl, 1.0N HCl and 1.0N NaOH (caustic, using plastic container or volumetric flask). The 0.5N $Na_2SO_4$ is used to feed the electrode compartments without evolution of chlorine gas.

3-III. Measurement Procedures (1) Resistance Measurement

Resistance here refers to area resistance $\Omega\text{-cm}^2$. The measurement contains 3 steps.

(a) Set up electrode positions: Prior to a measurement, the reference electrode horizontal positions are set. To set reference electrode position, a rigid plastic disc is used as a stand-in for the membrane. Each reference electrode is adjusted to just touch the plastic disc and their position fixed by two set screws.

(b) Measure the solution conductivity: The plastic disc was then removed and the two reference electrodes moved to 1.0 cm apart by removing the two 0.50 mm plastic blocks. The voltage drop between the two reference electrodes is recorded at an applied a current (~10-50 mA) by the Solartron 1280. The distance of the 2 reference electrodes (1.00 cm here), the current density (10.00 mA) and voltage (to 0.1 mV precision) used to obtain the conductivity of the solution (0.50 N NaCl typically.

(c) Measuring membrane resistance: The membrane sample is then placed by the sample slider and the voltage and current measured again. The resistance of membrane is the total resistance less the solution resistance measured in procedure (b)

(2) Counter Ion Permselectivity (Transport Number)

The measurement procedures are:

(a) Reference electrode position is set as described by part (a) of Resistance measurement. The reference electrodes position may be approximate since the voltage measured in this test is theoretically independent of the distance, but it is recommended that the position be located as reproducibly as possible.

(b) Solutions: After emplacing the sample membrane with the slider, pour 0.500N NaCl solution in the right part of the cell separated by the testing membrane and 0.250N NaCl on the left side of the cell.

(c) Measuring the voltage: the voltage was measured (without applying current) using a voltage meter attached to the platinum electrodes and data were entered the spreadsheet to obtain counter ion permselectivity.

3-IV. Sample Calculations:

C=conductivity (siemens/cm)

ρ=resistance (ohms/cm)

R=resistivity (ohm-$cm^2$ or $\Omega\cdot cm^2$)

A=area (cm²)
U, V=measured voltage (mV)
I=measured current (mA)
L=distance between reference electrodes
(1) Conductivity of the 0.500 M NaCl at 10.00 mA current and 33.1 mV measured for a reference electrode distance of 1.00 cm, the conductivity of solution:

$$C = \frac{1}{\rho} = \frac{L}{R} = \frac{L}{\frac{U}{I} \times A} = \frac{1.00 \text{ cm}}{\frac{33.1 \text{ mV}}{10.0 \text{ mA}} \times 7.00 \text{ cm}^2} = 0.0432 \text{ S/cm}$$

(2) Area resistance of the membrane calculation needs to subtract the solution resistance. For a CMX membrane with a measured potential of 38.0 mV, the area resistance is:

$$R = \frac{(38.1 - 33.1)\text{mV}}{10.0 \text{ mA}} \times 7.00 \text{ cm}^2 = 3.42 \Omega \cdot \text{cm}^2$$

(3) Permselectivity (transport number) of cation (+) or anion (−) membrane $T_\pm$ is obtained by:

$$V = (2T_\pm - 1)\frac{RT}{F}\ln\frac{a_L}{a_R}$$

Which rearranges to;

$$2T_\pm = 1 + VF \bigg/ RT\left(\ln\frac{a_R}{a_L}\right)$$

Where V is measured voltage by the reference electrodes, R is gas constant (8.314 Joule·K⁻¹·mole⁻¹) T is Kelvin temperature of solution, F is Faraday constant (96480 coulomb/mole) and $a_R$ and $a_L$ are concentration (activity format) of the solution on the two sides of the membrane in the cell.

What is claimed is:

1. An ion exchange membrane, comprising:
a microporous membrane support having a porous first side and a porous second side and a continuous porous structure comprising pores having a size of about 0.05 microns to about 10 microns extending from said first side to said second side; and
a crosslinked ion transferring polymer filling said porous structure, said polymer formed in the porous structure and comprising the polymerization product of at least one hydrophilic ionogenic monomer and a hydrophobic crosslinking monomer,
the ion exchange membrane having a permselectivity of greater than about 90%.

2. The ion exchange membrane of claim 1, wherein the thickness of the porous support is greater than about 55 microns and less than about 155 microns.

3. The ion exchange membrane of claim 1, wherein the thickness of the porous support is greater than about 20 microns and less than about 55 microns.

4. The ion exchange membrane of claim 1, wherein the microporous support comprises polypropylene, high molecular weight polyethylene, ultrahigh molecular weight polyethylene or polyvinylidene fluoride.

5. The ion exchange membrane of claim 1, wherein the ion transfer polymer is a cation transfer polymer and further comprises a a neutral monomer.

6. The ion exchange membrane of claim 5, wherein the at least one hydrophilic ionogenic monomer is 2-sulfoethylmethacrylate (2-SEM or 2-acrylamide-2-methyl propane sulfonic acid (AMPS).

7. The ion exchange membrane of claim 6, wherein the hydrophobic crosslinking monomer is ethyleneglycoldimethacrylate.

8. The membrane of claim 5, wherein the neutral monomer is hydroxyethylacrylate or hydroxymethacrylate.

9. The cation exchange membrane of claim 5, wherein the membrane has a resistivity not greater than about 0.5 Ohm-cm2.

10. The cation exchange membrane of claim 5, wherein the membrane has a resistivity not greater than about 0.5 Ohm-cm2 and a permselectivity of greater than about 95%.

11. The cation exchange membrane of claim 5, wherein the membrane has a resistivity not greater than about 0.5 Ohm-cm2 and a permselectivity of greater than about 99%.

12. The cation exchange membrane of claim 5, wherein the membrane has a resistivity not greater than about 1.0 Ohm-cm2.

13. The cation exchange membrane of claim 5, wherein the membrane has a resistivity not greater than about 1.0 Ohm-cm2 and a permselectivity of greater than about 95%.

14. The cation exchange membrane of claim 5, wherein the membrane has a resistivity not greater than about 0.5 Ohm-cm2 and a permselectivity of greater than about 99%.

15. The ion exchange membrane of claim 1, wherein the ion transfer polymer is an anion transfer polymer and further comprises a neutral monomer.

16. The anion exchange membrane of claim 15, wherein the at least one hydrophilic ionogenic monomer is Trimethylammonium ethyl methacrylic chloride and the hydrophobic crosslinking monomer is ethylene glycol dimethacrylate.

17. The anion exchange membrane of claim 15, wherein the at least one hydrophilic ionogenic monomer is Trimethylammonium ethyl methacrylic chloride and vinylbenzyl trimethylammonium chloride and the hydrophobic crosslinking monomer is divinylbenzene.

18. The anion exchange membrane of claim 17, wherein the neutral monomer is hydroxyethylacrylate or hydroxymethacrylate.

19. The anion exchange membrane of claim 15, wherein the membrane has a resistivity not greater than about 1.0 Ohm-cm2.

20. The anion exchange membrane of claim 15, wherein the membrane has a resistivity not greater than about 1.0 Ohm-cm2 and a permselectivity of greater than about 94%.

21. The anion exchange membrane of claim 15, wherein the membrane has a resistivity not greater than about 0.5 Ohm-cm2.

22. The anion exchange membrane of claim 15, wherein the membrane has a resistivity not greater than about 0.5 Ohm-cm2 and a permselectivity of greater than about 94%.

23. The ion exchange membrane of claim 1, wherein the continuous porous structure comprises pores having a size of about 0.1 microns to about 1.0 microns.

24. The ion exchange membrane of claim 23, wherein the continuous porous structure comprises pores having a size of about 0.1 microns to about 0.2 microns.

25. The ion exchange membrane of claim 1, wherein the microporous membrane support has a porosity of greater than about 45%.

26. The ion exchange membrane of claim 25, wherein the microporous membrane support has a porosity of greater than about 60%.

* * * * *